US012718508B2

(12) United States Patent
Zong et al.

(10) Patent No.: US 12,718,508 B2
(45) Date of Patent: Aug. 25, 2026

(54) DATA PROCESSING METHOD AND APPARATUS, ELECTRONIC DEVICE AND STORAGE MEDIUM

(71) Applicant: Beijing Zitiao Network Technology Co., Ltd., Beijing (CN)

(72) Inventors: Jinjin Zong, Beijing (CN); Gan Lian, Beijing (CN); Chuanjian Fu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 237 days.

(21) Appl. No.: 18/533,127

(22) Filed: Dec. 7, 2023

(65) Prior Publication Data

US 2024/0193894 A1 Jun. 13, 2024

(30) Foreign Application Priority Data

Dec. 9, 2022 (CN) ........................ 202211584186.0
Dec. 9, 2022 (CN) ........................ 202211585054.X
Dec. 15, 2022 (CN) ........................ 202211616610.5

(51) Int. Cl.
*G06T 19/20* (2011.01)
*A63F 13/52* (2014.01)
*A63F 13/577* (2014.01)

(52) U.S. Cl.
CPC .............. *G06T 19/20* (2013.01); *A63F 13/52* (2014.09); *A63F 13/577* (2014.09); *G06T 2219/2004* (2013.01)

(58) Field of Classification Search
CPC ......... G06T 19/20; A63F 13/577; A63F 13/52
USPC .......................................................... 345/419
See application file for complete search history.

(56) References Cited

U.S. PATENT DOCUMENTS 8,812,954 B2 * 8/2014 Shuster .................. G06T 19/20 345/473
9,607,474 B2 * 3/2017 Nguyen .............. G07F 17/3209
2013/0047217 A1 * 2/2013 Shuster .................. H04L 67/02 726/4
2024/0143126 A1 * 5/2024 Wang ................. G06F 3/04845

FOREIGN PATENT DOCUMENTS

CN 109011556 A 12/2018
CN 109107162 A 1/2019
CN 115138078 A 10/2022

* cited by examiner

*Primary Examiner* — Thomas J Lett
(74) *Attorney, Agent, or Firm* — BakerHostetler

(57) ABSTRACT

A data processing method and an apparatus, an electronic equipment and a storage medium are provided. The data processing method includes: acquiring the first quantity of the first object entering a spatial region corresponding to the first space object, the first space object being an object in a current virtual scene, and the first object being a virtual object corresponding to the first user in the virtual scene; and executing an instruction corresponding to the first space object and/or the first object in a case where the first quantity and a preset intra-group quantity threshold satisfy a first preset relationship.

19 Claims, 9 Drawing Sheets

DATA PROCESSING METHOD AND APPARATUS, ELECTRONIC DEVICE AND STORAGE MEDIUM

CROSS-REFERENCE TO RELATED APPLICATION

The present disclosure claims priorities of the Chinese Patent Application with the application number 202211585054.X that is filed on Dec. 9, 2022, the Chinese patent application with the application number 202211584186.0 that is filed on Dec. 9, 2022, and the Chinese patent application with the application number 202211616610.5 that is filed on Dec. 15, 2022, and the disclosure of these Chinese patent applications is incorporated herein by reference in entirety as part of the present disclosure.

TECHNICAL FIELD

The present disclosure belongs to the field of virtual reality technology, and in particular relates to a data processing method and a data processing apparatus, an electronic device, and a storage medium.

BACKGROUND

Virtual Reality (VR) technology, also known as virtual reality or spiritual technology, is implemented based on computer technology, utilizing the latest development results of a variety of high technologies, and with the help of the computer and other devices to produce a realistic three-dimensional virtual world with vision, touch, smell and other sensory experiences, so that people in the virtual world have an immersive feeling. In related technologies, in a VR scene, in the case where a plurality of virtual objects corresponding to a plurality of users move in the virtual world, generally, feedback is only given to the user for the position of a single virtual object, and the scenario where feedback is given to a plurality of users is not applicable.

SUMMARY

At least one embodiment of the present disclosure provides a data processing method, which includes: acquiring the first quantity of the first object entering a spatial region corresponding to the first space object, the first space object being an object in a current virtual scene, and the first object being a virtual object corresponding to the first user in the virtual scene; and executing an instruction corresponding to the first space object and/or the first object in the case where the first quantity and a preset intra-group quantity threshold satisfy the first preset relationship.

At least one embodiment of the present disclosure provides a data processing apparatus, which includes: an acquisition unit and an execution unit. The acquisition unit is configured to acquire the first quantity of the first object in a spatial region corresponding to the first space object. The first space object is an object in the current virtual scene, and the first object is a virtual object corresponding to a first user in the virtual scene. The execution unit is configured to execute an instruction corresponding to the first space object and/or the first object in the case where the first quantity and a preset intra-group quantity threshold satisfy a first preset relationship.

At least one embodiment of the present disclosure provides an electronic device, which includes: at least one processor and at least one memory. The at least one memory is configured to store executable instructions for the least one processor. The at least one processor is configured to execute the method of any one of the various possible embodiments upon executing the executable instructions.

At least one embodiment of the embodiments of the present disclosure provide a computer-readable storage medium, on which a computer program is stored. In the case where the computer program is executed by the at least one processor, the method of any one of the various possible embodiments is implemented.

At least one embodiment of the embodiments of the present disclosure provide a computer program product, which included a computer program. In the case where the computer program is executed by the at least one processor, the method of any one of the various possible embodiments is implemented.

The solution provided by at least one embodiment of the present disclosure can utilize acquiring the first quantity of the first object in the spatial region corresponding to the first space object, the first space object being the object in the current virtual scene, and the first object being the virtual object corresponding to the first user in the virtual scene; and executing the instruction corresponding to the first space object and/or the first object in the case where the first quantity and the preset intra-group quantity threshold satisfy the first preset relationship. Therefore, the at least one embodiment may be combined with the analysis of the quantity of the virtual object corresponding to the user in the virtual scene to execute the corresponding instruction, implementing the technical effect of giving feedback to a plurality of users in the case where a plurality of virtual objects corresponding to a plurality of users move in the virtual world in the VR scene, and improving the realism of the scene and improves the user experience.

BRIEF DESCRIPTION OF THE DRAWINGS

In order to illustrate the embodiments of the present disclosure or the technical solution in the related art more clearly, the following briefly introduces the drawings that are required to be used in the embodiments or the related technical description. Obviously, the drawings described below are some embodiments of the present disclosure. For those of ordinary skill in the art, without the premise of creative labor, other drawings can also be acquired according to these accompanying drawings. In the drawings.

DETAILED DESCRIPTION

Figure 1:
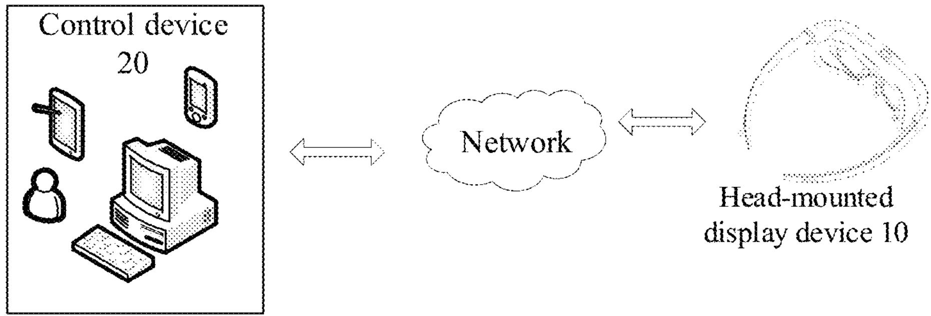
FIG. 1 is a structural schematic diagram of a system provided by an exemplary embodiment of the present disclosure.

The embodiments of the present disclosure are described in detail below, and the examples of the embodiments are illustrated in the drawings. The embodiments described below by relating to the drawings are exemplary, and aim at explaining the present disclosure, but cannot be understood as limitations on the present disclosure.

The terms "first", "second", and so on in the specification, claims and drawings of embodiments of the present disclosure are used to distinguish the similar object, and are not used to describe a specific order or sequence. It should be understood that the data so used can be interchanged in the appropriate cases, so that the embodiments of the embodiments of the present disclosure described herein, for example, are implemented in an order other than those illustrated or described herein. Further, the terms "including" and "comprising", and any variation of "including" and "comprising" are intended to cover non-exclusive inclusions, for example, including processes, methods, products or devices of a series of steps or units and being not limited to the steps or units that are clearly listed, but including other steps or units that are not clearly listed or implicit for the processes, methods, products or devices.

Firstly, the following explains some of the terms in the embodiments of the present disclosure so that those skilled in the art understand.

The circumscribed sphere indicates a circumscribed sphere of spatial geometry graphics. For the rotating body and polyhedron, the circumscribed sphere has different definitions, and is broadly understood that a sphere surrounds the geometry, and the vertices and arcs of the geometry are on this sphere. In the case where the vertices of a regular polyhedron are on the same sphere surface, the sphere is called the circumscribed sphere of the regular polyhedron.

Global Positioning System (GPS) is a high-precision radio navigation positioning system based on the artificial earth satellite, and can provide the accurate geographical location, the vehicle speed and the accurate time information anywhere in the world and near-earth space.

Simultaneous Localization and Mapping (SLAM) is first proposed in the field of robotics, and indicates that the robot starts from an unknown location in the unknown environment, locates its own position and attitude through the environmental features that are repeatedly observed during the movement, and then builds an incremental map of the surrounding environment according to its own location, so that the purpose of simultaneous positioning and map construction is implemented.

Virtual Reality (VR) technology, also known as virtual reality or spiritual technology, is implemented based on computer technology, utilizing the latest development results of a variety of high technologies, and with the help of the computer and other devices to produce a realistic three-dimensional virtual world with vision, touch, smell and other sensory experiences, so that people in the virtual world have an immersive feeling. VR technology can realize the fusion of virtual environments, interactive three-dimensional dynamic scene, and simulation of entity behavior, allow users to be able to immerse themselves in the simulated virtual reality environment, and can realize the application in various virtual environments such as maps, games, videos, education, medical treatment, simulation, collaborative training, sales, assistance in manufacturing, maintenance, and repairing.

In the related technologies, in the VR scene, in the case where a plurality of virtual objects corresponding to a plurality of users move in the virtual world, generally, feedback is given to the user corresponding to the virtual object for the position of a single virtual object, and the scenario where feedback is given to the users corresponding to a plurality of virtual objects is not applicable.

At least one embodiment of the present disclosure provides a data processing method and an apparatus, an electronic device and a storage medium, which are configured to avoid or eliminate the problem in the related technologies. The problem is that in a VR scene, in the case where a plurality of virtual objects corresponding to a plurality of users move in the virtual world, generally, feedback is only given to the user corresponding to the virtual object for the position of a single virtual object, and the scenario where feedback is given to a plurality of users is not applicable.

The following illustrates the technical solution provided by at least one embodiment of the present disclosure and how the technical solution provided by at least one embodiment of the present disclosure solves the above technical problem with specific embodiments in detail. The following specific embodiments can be combined with each other, and the same or similar concepts or processes may not be repeated in certain embodiments. The embodiments of the present disclosure are described below in conjunction with the drawings.

FIG. 1 is a structural schematic diagram of a system provided by an exemplary embodiment of the present disclosure. The system includes a head-mounted display device 10 and a control device 20, etc. The head-mounted display device 10 and the control device 20 are connected via a network, for example, via wired or wireless network connection.

In an optional embodiment, the head-mounted display device 10 is configured for the user wearing, and interacts with the user. Specifically, the user is allowed to interact with the head-mounted display device 10 or the display content of the head-mounted display device 10 by any one or more than one of the various ways such as the handle, the voice, the eyeball, etc. Further, the display content is displayed in the head-mounted display device 10, and is allowed to be the virtual reality content or the mixed reality content, or the augmented reality content, or is allowed to be other types of content.

The control device 20 is allowed to be a device such as a terminal or a server. The terminal is allowed to be a smart phone, a tablet computer, a laptop, an intelligent voice interaction device, a smart home appliance and other devices, and the terminal is allowed to also include a client. The client is allowed to be a video client, a browser client or an instant messaging client, etc. The server is allowed to be an independent physical server, is allowed to be also a server cluster that is composed of a plurality of physical servers or a distribution system, and is also allowed to be a cloud server that provides cloud services, cloud databases, cloud computation, cloud functions, cloud storage, network services, cloud communications, middleware services, domain name services, security services, content delivery networks (CDNs), and the basic cloud computation service such as big data, artificial intelligence platforms, etc.

The control device 20 is configured to provide the display content to the head-mounted display device 10.

In some embodiments, in the case where the head-mounted display device 10 displays the screen content that is received from the control device 20, the control device 20 is allowed to be configured to execute the following data processing method: acquiring the first quantity of the first object entering a spatial region corresponding to the first space object, the first space object being an object in a current virtual scene, and the first object being a virtual object corresponding to the first user in the virtual scene; and executing an instruction corresponding to the first space object and/or the first object in the case where the first quantity and a preset intra-group quantity threshold satisfy the first preset relationship.

Optionally, the virtual scene is allowed to be a scene corresponding to the display screen that is currently displayed. The display screen is displayed in the display of the head-mounted display device 10. The display screen is allowed to be a three-dimensional image.

Optionally, the virtual scene is allowed to be a virtual reality scene, a mixed reality scene, or an augmented reality scene. According to different types of scene content, the scene corresponding to the display screen is allowed to be specifically a three-dimensional space game scene, a three-dimensional space meeting scene, etc.

Optionally, the first space object is an object that has a space to accommodate, such as an elevator, a conference room, a building, etc.

In another optional embodiment, the data processing method is also allowed to be executed by the head-mounted display device 10 itself. The system is also allowed to include only the head-mounted display device 10, i.e., the head-mounted display device 10 is an all-in-one machine. Specifically, the head-mounted display device 10 is configured for: acquiring the first quantity of the first object entering a spatial region corresponding to the first space object, the first space object being an object in a current virtual scene, and the first object being a virtual object corresponding to the first user in the virtual scene; and executing an instruction corresponding to the first space object and/or the first object in the case where the first quantity and a preset intra-group quantity threshold satisfy the first preset relationship.

The detailed implementation of the data processing method, and the specific functions of the head-mounted display device 10 or control device 20, are described in detail below. It should be noted that the description order of the following embodiments is not used as a limitation for the priority of the embodiments.

Figure 2:
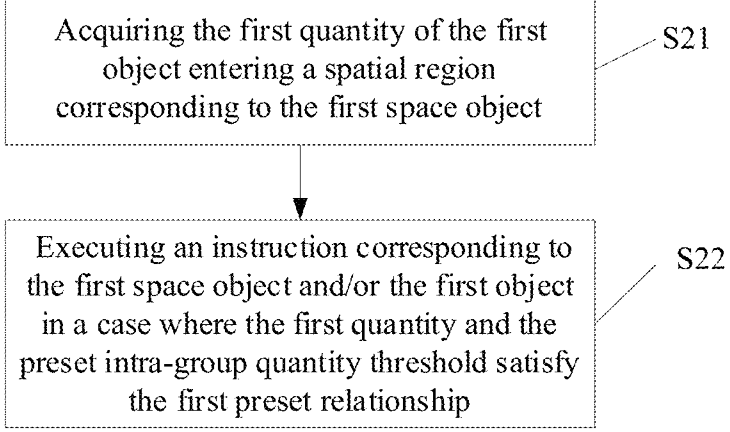
FIG. 2 is a flowchart schematic diagram of a data processing method provided by an embodiment of the present disclosure.

FIG. 2 is a flowchart schematic diagram of a data processing method provided by an embodiment of the present disclosure, the execution body of the method is allowed to be the head-mounted display device 10, and is also allowed to be the control device 20. The method includes at least the following Steps S21-S22:

Step S21, acquiring the first quantity of the first object entering a spatial region corresponding to the first space object, the first space object being an object in a current virtual scene, and the first object being a virtual object corresponding to the first user in the virtual scene.

Optionally, the virtual scene is allowed to be the scene corresponding to the display screen that is currently displayed, the display screen is displayed in the display of the head-mounted display device, and the display screen is allowed to be a three-dimensional image.

Optionally, the virtual scene is allowed to be a virtual reality scene, a mixed reality scene, or an augmented reality scene. According to different types of scene content, the scene corresponding to the display screen is allowed to be specifically a three-dimensional space game scene, a three-dimensional space meeting scene, etc.

Optionally, the first space object is an object that has a space to accommodate, such as an elevator, a conference room, a building, etc.

Optionally, the first space object is any alternative space object of a plurality of alternative space objects in the virtual scene, in which the alternative space object is allowed to be a building, or a portion of the building to accommodate space. Specifically, the alternative space object is allowed to be an elevator (straight lift) in the building, or a room in the building (such as a conference room). The first space object is allowed to be a virtual object or a real object.

Optionally, the spatial region corresponding to the first space object is allowed to be the scene range that is occupied by the first space object in the scene corresponding to the display screen, where the scene range is allowed to indicate the coordinate range in the camera coordinate system.

Specifically, in the case where the first space object is an elevator, the spatial region corresponding to the first space object is the spatial region in the elevator. In the case where the first space object is a conference room, the spatial region corresponding to the first space object is the spatial region in the conference room.

Optionally, the first user is allowed be a player participating in the current scene, for example, the player is a player who wears a head-mounted display device. The virtual object corresponding to the first user in the virtual scene is allowed to be a virtual cartoon character corresponding to the first user in the virtual scene, or the virtual camera corresponding to the first user in the scene.

Optionally, the first object is included in the alternative object, and the alternative object is a virtual object corresponding to at least some users participating in the virtual scene.

Optionally, according to whether the target coordinate of the alternative object in the virtual scene is included in the spatial region corresponding to the first space object, whether the alternative object is the first object entering the spatial region corresponding to the first space object is determined.

Specifically, in the case where the target coordinate of the alternative object in the virtual scene is not included in the spatial region corresponding to the first space object, the alternative object not entering the spatial region corresponding to the first space object is determined. In the case where the target coordinate of the alternative object in the virtual scene is included in the spatial region corresponding to the first space object, the alternative object entering the spatial region corresponding to the first space object is determined, that is, the alternative object is the first object entering the spatial region corresponding to the first space object.

Optionally, the target coordinate of the alternative object in the virtual scene is the real-time coordinate of the first object in the virtual scene. The target coordinate is allowed to be a coordinate or a coordinate range, and the coordinate range is allowed to indicate the coordinate range of the space that is occupied by the alternative object in the virtual scene.

Step S22, executing an instruction corresponding to the first space object and/or the first object in the case where the first quantity and the preset intra-group quantity threshold satisfy the first preset relationship.

Optionally, the preset intra-group quantity threshold is a positive integer.

In some optional embodiments of the present disclosure, in Step S22, the executing an instruction corresponding to the first space object and/or the first object, includes: executing a display instruction corresponding to the first space object and/or the first object.

Optionally, in the case where the first preset relationship is that the first quantity is less than the preset intra-group quantity threshold, the display instruction corresponding to the first space object is allowed to be an instruction for controlling the display of the first prompt information corresponding to the first space object.

Optionally, the display of the first prompt information corresponding to the first space object, includes at least one of the following: adjusting the theme color of the first space object to the preset first color, and displaying the first text information corresponding to the first space object, in which the first prompt information is used to prompt that the spatial region corresponding to the first space object is not full.

Optionally, in the case where the first space object is an elevator, the theme color of the first space object is allowed to be the display color of the elevator door of the elevator, and the first text information corresponding to the first space object is allowed to be the prompt information such as "the elevator is not full".

Optionally, in the case where the first space object is a conference room, the theme color of the first space is allowed to be the display color of the conference room wall, and the first text information corresponding to the first space object is allowed to be the prompt information such as "the conference room is not full".

Optionally, in the case where the first preset relationship is that the first quantity is less than the preset intra-group quantity threshold, the first text information is allowed to be displayed on the outside of the first space object, so that the other alternative object that is outside the first space object is allowed to view. The first text information is also allowed to be displayed in the display screen in the head-mounted display device worn by the alternative user corresponding to the alternative object of the first space object.

Optionally, in the case where the first preset relationship is that the first quantity equals to the preset intra-group quantity threshold, the display instruction corresponding to the first space object is allowed to be an instruction for controlling the display of the second prompt information corresponding to the first space object.

Optionally, the display of the second prompt information corresponding to the first space object, includes at least one of the following: adjusting the theme color of the first space object to the preset second color, displaying the second text information corresponding to the first space object, and displaying the first preset video corresponding to the first space object, in which the second prompt information is used to prompt that the spatial region corresponding to the first space object is full.

Optionally, in the case where the first space object is an elevator, the second text information corresponding to the first space object is allowed to be the prompt information such as "the elevator is fully loaded", and the first preset video corresponding to the first space object is allowed to be the first preset video content corresponding to the elevator. The second text information and the first preset video content are allowed to be set by the relevant personnel.

Optionally, in the case where the first space object is a conference room, the second text information corresponding to the first space object is allowed to be the prompt information such as "the conference room is full", and the first preset video corresponding to the first space object is allowed to be the preset meeting content corresponding to the conference room. The second text information and the first preset video content are allowed to be set by the relevant personnel.

Optionally, in the case where the first preset relationship is that the first quantity is larger than the preset intra-group quantity threshold, the display instruction corresponding to the first space object is allowed to be an instruction for controlling the display of the third prompt information corresponding to the first space object.

Optionally, the display of the third prompt information corresponding to the first space object, includes at least one of the following: adjusting the theme color of the first space object to the preset third color, and displaying the third text information corresponding to the first space object, in which the third prompt information is used to prompt that the spatial region corresponding to the first space object is overcrowded.

Optionally, in the case where the first space object is an elevator, the third text information corresponding to the first space object is allowed to be the prompt information such as "the elevator is overloaded, please take another elevator".

Optionally, in the case where the first space object is a conference room, the third text information corresponding to the first space object is allowed to be the prompt information such as "the conference room is overcrowded, please go to another conference room".

Optionally, the preset first color, the preset second color and the preset third color are different, and are allowed to be set by the relevant personnel or user.

Figure 3:
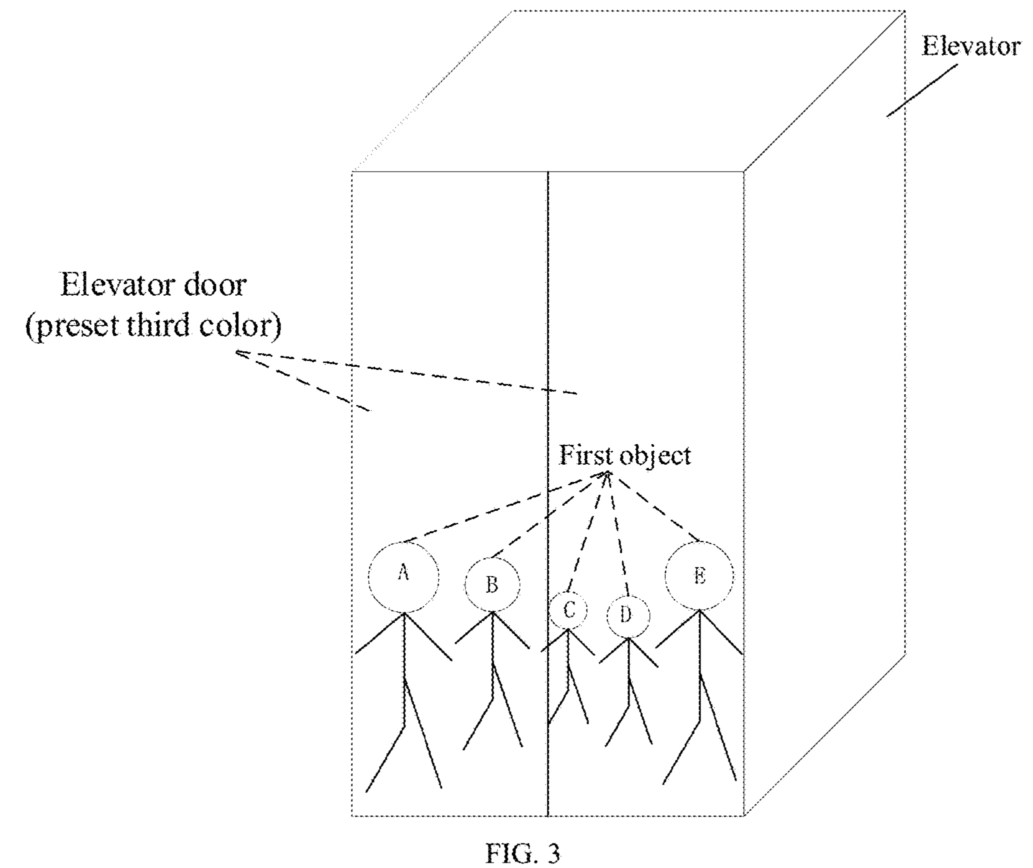
FIG. 3 is a schematic diagram of a first space object provided by an exemplary embodiment of the present disclosure.

Specifically, referring to FIG. 3, FIG. 3 is a schematic diagram of the first space object provided by an exemplary embodiment of the present disclosure. In the case where the preset intra-group quantity threshold is 4, the acquired first object entering the spatial region corresponding to the first space object (elevator) includes A, B, C, D and E, that is, the first quantity of the first object is 5, and then the first quantity is determined to be larger than the preset intra-group quantity threshold. In response to the first preset in which the first quantity is larger than the preset intra-group quantity threshold, the color of the elevator door of the elevator is adjusted to the preset third color.

Optionally, in the case where the first preset relationship is that the first quantity is less than the preset intra-group quantity threshold, the display instruction corresponding to the first object is allowed to be an instruction for controlling the display of the fourth prompt information corresponding to the first object.

Optionally, the display of the fourth prompt information corresponding to the first object includes: displaying the fourth text information corresponding to the first object, in which the fourth prompt information is used to prompt the first object that the spatial region corresponding to the first space object is not full.

Optionally, in the case where the first preset relationship is that the first quantity equals to the preset intra-group quantity threshold, the display instruction corresponding to the first object is allowed to be an instruction for controlling the display of the fifth prompt information corresponding to the first object.

Optionally, the display of the fifth prompt information corresponding to the first object includes at least one of the following: displaying the fifth text information corresponding to the first object, and displaying the second preset video corresponding to the first object, in which the fifth prompt information is used to prompt the first object that the spatial region corresponding to the first space object is full.

Optionally, in the case where the first preset relationship is that the first quantity is larger than the preset intra-group quantity threshold, the display instruction corresponding to the first object is allowed to be an instruction for controlling the display of the sixth prompt information corresponding to the first object.

Optionally, the display of the sixth prompt information corresponding to the first object includes: displaying the sixth text information corresponding to the first object, in which the sixth prompt information is used to prompt that the spatial region corresponding to the first space object of the first object is overcrowded.

Optionally, the first information, the second information, the third information, the fourth information, the fifth information, and the sixth information are allowed to be displayed in the display of the head-mounted display device of the first object, and are also allowed to be displayed in the display of the head-mounted display device of the remaining alternative object.

In other optional embodiments of the present disclosure, in S22, executing an instruction corresponding to the first space object and/or the first object, includes: executing an audio playback instruction corresponding to the first space object and/or the first object.

Optionally, in the case where the first preset relationship is that the first quantity is less than the preset intra-group quantity threshold, executing an audio playback instruction corresponding to the first space object, includes: playing the preset first audio corresponding to the first space object, in which the preset first audio is used to prompt that the spatial region corresponding to the first space object is not full.

Optionally, in the case where the first preset relationship is that the first quantity equals to the preset intra-group quantity threshold, executing an audio playback instruction corresponding to the first space object, includes: playing the preset second audio corresponding to the first space object, in which the preset second audio is used to prompt that the spatial region corresponding to the first space object is full.

Optionally, in the case where the first preset relationship is that the first quantity is larger than the preset intra-group quantity threshold, executing an audio playback instruction corresponding to the first space object, includes: playing the preset third audio corresponding to the first space object, in which the preset third audio is used to prompt that the spatial region corresponding to the first space object is overcrowded.

Optionally, in the case where the first preset relationship is that the first quantity is less than the preset intra-group quantity threshold, executing an audio playback instruction corresponding to the first object, includes: playing the preset fourth audio corresponding to the first object, in which the preset fourth audio is used to prompt the first object that the spatial region corresponding to the first space object is not full.

Optionally, in the case where the first preset relationship is that the first quantity equals to the preset intra-group quantity threshold, executing an audio playback instruction corresponding to the first object, includes: playing the preset fifth audio corresponding to the first object, in which the preset fifth audio is used to prompt the first object that the spatial region corresponding to the first space object is full.

Optionally, in the case where the first preset relationship is that the first quantity is larger than the preset intra-group quantity threshold, executing an audio playback instruction corresponding to the first object, includes: playing the preset sixth audio corresponding to the first space object, in which the preset sixth audio is used to prompt the first object that the spatial region corresponding to the first space object is overcrowded.

This solution can provide a plurality of users with more alternative space objects corresponding to the spatial region where the users are, or visual or sound information input that is related to a plurality of users. Compared with the image that only provides the first perspective for users, the solution can enable a plurality of users to acquire more feedback, and further improve the user experience.

In some optional embodiments of the present disclosure, in S22, executing an instruction corresponding to the first space object, includes: adjusting the position information of the first space object; and executing an instruction corresponding to the first space object, includes: adjusting the position information and/or attitude information of the first object.

In some optional embodiments of the present disclosure, in the case where the first preset relationship is that the first quantity equals to the preset intra-group quantity threshold, in Step S22, executing an instruction corresponding to the first space object, includes: controlling the first space object to move. Optionally, in the case where the first space object is an elevator, the first space object is controlled to move, that is, the elevator is controlled to start to rise or fall.

The solution provided by at least one embodiment of the present disclosure acquires the first quantity of the first object in the spatial region corresponding to the first space object, the first space object being an object in the current virtual scene, and the first object being a virtual object corresponding to the first user in the virtual scene; and executes an instruction corresponding to the first space object and/or the first object in the case where the first quantity and the preset intra-group quantity threshold satisfy the first preset relationship. Combined with the analysis of the quantity of the virtual object corresponding to the users in the virtual scene, executing the corresponding instruction implements the technical effect of giving feedback to a plurality of users in the case where a plurality of virtual objects corresponding to a plurality of users move in the virtual world in the VR scene, and improves the realism of the scene and improves the user experience.

In some optional embodiments, the method further includes Steps S01-S02:

Step S01, acquiring the second quantity of the second object entering the spatial region corresponding to the second space object, the second space object being an object in the virtual scene, and the second object being a virtual object corresponding to the second user in the virtual scene; and Step S02, executing an instruction corresponding to the second space object and/or the second object in the case where the second quantity and the preset intra-group quantity threshold satisfy the second preset relationship.

Optionally, the second space object is a plurality of alternative space objects in the virtual scene other than the first space object.

Optionally, the instruction corresponding to the second space object is allowed to be an instruction for controlling the display of the prompt information corresponding to the second space object. In the case where the second preset relationship is that the second quantity is less than the preset intra-group quantity threshold, the prompt information corresponding to the second space object is used to prompt that the spatial region corresponding to the second space object is not full. In the case where the second preset relationship is that the second quantity equals to the preset intra-group quantity threshold, the prompt information corresponding to the second space object is used to prompt that the spatial region corresponding to the second space object is full. In the case where the second preset relationship is that the second quantity is larger than the preset intra-group quantity threshold, the prompt information corresponding to the second space object is used to prompt that the spatial region corresponding to the second space object is overcrowded.

Optionally, the instruction corresponding to the second object is allowed to be an instruction for controlling the display of prompt information corresponding to the second object. In the case where the second preset relationship is that the second quantity is less than the preset intra-group quantity threshold, the prompt information corresponding to the second object is used to prompt the second object that the spatial region corresponding to the second space object is not full. In the case where the second preset relationship is that the second quantity equals to the preset intra-group quantity threshold, the prompt information corresponding to the second object is used to prompt the second object that the spatial region corresponding to the second space object is full. In the case where the second preset relationship is that the second quantity is larger than the preset intra-group quantity threshold, the prompt information corresponding to the second object is used to prompt the second object that the spatial region corresponding to the second space object is overcrowded.

Optionally, in the case where the second preset relationship is that the second quantity equals to the preset intra-group quantity threshold, the instruction corresponding to the second space object further includes: an instruction for controlling the display of the third preset video corresponding to the second space object; and the instruction corresponding to the second object further includes an instruction for controlling the display of the fourth preset video corresponding to the second object.

Optionally, the specific implementation of Step S01-S02 can refer to Step S21-S22 described above, and is repeated herein.

Through the solution provided by at least one embodiment of the present disclosure, the scene is allowed to include a plurality of alternative space objects. For example, in the case where the scene includes the first space object and the second space object, the corresponding instruction is allowed to be flexibly executed according to the quantity of the users in each alternative space object, and the user experience is improved.

In some optional embodiments of the present disclosure, the instruction corresponding to the first space object and/or the first object is related to the second object. Optionally, any one or more than one prompt information of the first prompt information, the second prompt information, the third prompt information, the fourth prompt information, the fifth prompt information, and the sixth prompt information is further allowed to include: the quantity of the second object in the second space.

Through the solution provided by at least one embodiment of the present disclosure, the user situation in other alternative space object (such as the second space object) is allowed to be reflected in real time to the user in the spatial region corresponding to the current alternative space object (such as the first space object), which enables the user to acquire more abundant and more comprehensive information, and further improves the immersion of the user.

In some optional embodiments, with respect to how to determine whether an alternative object is the first object entering the spatial region corresponding to the first space object, the method further includes Steps S31-S32:

S31, with respect to an alternative object in the virtual scene, performing a collision detection on the alternative object and the spatial region corresponding to the first space object, and obtaining a collision detection result used to indicate whether the alternative object collides with the spatial region corresponding to the first space object.

Optionally, in Step S31, the collision detection includes at least one of the following: a circumscribed sphere collision detection, an Axis Aligned Bounding Box (AABB) collision detection, and an Oriented Bounding Box (OBB) collision detection.

Step S32, according to the collision detection result, determining whether the alternative object is the first object entering the spatial region corresponding to the first space object.

Optionally, in Step S32, according to the collision detection result, determining whether the alternative object is the first object entering the spatial region corresponding to the first space object, includes: in the case where the collision detection result indicates that the alternative object collides with the spatial region corresponding to the first space object, the alternative object is determined to be the first object entering the spatial region corresponding to the first space object; and in the case where the collision detection result indicates that the alternative object does not collide with the spatial region corresponding to the first space object, the alternative object is determined not to be the first object in the spatial region corresponding to the first space object.

Optionally, for the determination method of the preset intra-group quantity threshold, the determination method further includes the following Steps S41-S42:

Step S41, acquiring the third quantity of an alternative object in the virtual scene, and the fourth quantity of an alternative space object, the alternative object being a virtual object corresponding to at least some of users participating in the virtual scene.

Optionally, in the case where the virtual scene is a game scene, the third quantity of the alternative object is allowed to be the quantity of online players in the game scene.

Step S42, determining the preset intra-group quantity threshold based on the third quantity and the fourth quantity.

Optionally, in Step S42, based on the third quantity and the fourth quantity, determining the preset intra-group quantity threshold, includes S421-S422:

Step S421, performing a remainder operation on the fourth quantity based on the third quantity, and obtaining a remainder operation result; and Step S422, determining the preset intra-group quantity threshold according to the remainder operation result.

Optionally, in S422, determining the preset intra-group quantity threshold according to the remainder operation result, includes:

in the case where the remainder operation result is 0, the ratio of the third quantity to the fourth quantity is determined as the preset intra-group quantity threshold; and in the case where the remainder operation result is not 0, the value of the integer part of the ratio of the third quantity to the fourth quantity is determined, and the sum of the value of the integer part and 1 is determined as the preset intra-group quantity threshold.

For example, assuming that the third quantity is 20 and the fourth quantity is 4, based on the third quantity, the remainder operation is performed on the fourth quantity to obtain the reminder operation result of 0, then the ratio of the third quantity to the fourth quantity, 5 (20/4=5) is determined as the preset intra-group quantity threshold;

For further example, assuming that the third quantity is 22 and the fourth quantity is 4, based on the third quantity, the remainder operation is performed on the fourth quantity, and the remainder operation result is 2, that is, the remainder operation result is not 0, then the integer part of the ratio of the third quantity to the fourth quantity is determined to be 5, and the sum of the integer part and 1, 6 (5+1=6) is determined as the preset intra-group quantity threshold.

In the solution provided by at least one embodiment of the present disclosure, the quantity threshold of the user that is allowed to be accommodated in the spatial region corresponding to each alternative space object is determined according to the quantity of the alternative object actually in the virtual scene and the quantity of the alternative space object in the scene. The processing method is more flexible, and the user sense of interaction and immersion is stronger.

In some optional embodiments of the present disclosure, in the case where the first preset relationship is that the first quantity is larger than or equals to the preset intra-group quantity threshold, in Step S22, executing an instruction corresponding to the first space object and/or the first object, includes Steps S51-S52:

Step S51, in a plurality of the alternative space objects, or in the remaining alternative space objects other than the first space object in a plurality of the alternative space object, acquiring the third space object where the quantity of the third object entering the corresponding spatial region is less than the preset intra-group quantity threshold; and Step S52, according to the third space object, displaying the corresponding seventh prompt information, in which the seventh prompt information is used to prompt that the spatial region corresponding to the third space object is not full, and/or, displaying the quantity of the third object entering the spatial region corresponding to the third space object.

Optionally, the third object is allowed to be a virtual object corresponding to the third user in the virtual scene.

Optionally, the third user includes the second user.

Optionally, with respect to how to determine whether the alternative object enters the spatial region corresponding to the alternative space object, that is, the method of determining whether the alternative object is the third object entering the spatial region corresponding to the alternative space object, is allowed to refer to the above method of how to determine whether the alternative object is the first object entering the spatial region corresponding to the first space object, which is not repeated here.

Optionally, in the case where the first quantity is less than or equals to the preset intra-group quantity threshold, the seventh prompt information is displayed outside the first space object, so that the alternative object that does not enter the spatial region corresponding to the first space object views.

Optionally, in the case where the first quantity is larger than the preset intra-group quantity threshold, the seventh prompt information is displayed inside the first space object, so that the alternative object that enters the spatial region corresponding to the first space object, that is, the first object views.

Specifically, in response to the first space object being an elevator, in the case where the first quantity equals to the preset intra-group quantity threshold, the seventh prompt information is allowed to be the prompt information such as "the elevator is fully loaded, please take XX (the third space object)"; and in the case where the first quantity is larger than the preset intra-group quantity threshold, the seventh prompt information is allowed to be the prompt information such as "the elevator is overloaded, please leave the elevator, and take XX (the third space object)". In response to the first space object being a conference room, in the case where the first quantity equals to the preset intra-group quantity threshold, the seventh prompt information is allowed to be the text information such as "the conference room is full, please go to XX (the third space object)"; and in the case where the first quantity is larger than the preset intra-group quantity threshold, the seventh prompt information is allowed to be the prompt information such as "the conference room is overcrowded, please leave the conference room, and go to XX (the third space object)".

Figure 4:
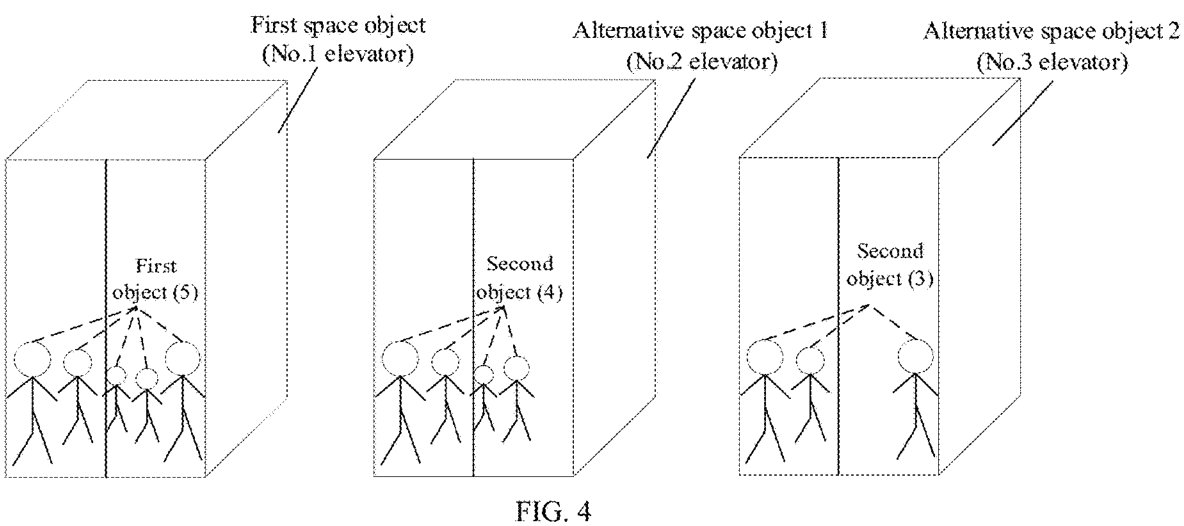
FIG. 4 is a schematic diagram of an alternative space object provided by an exemplary embodiment of the present disclosure.

FIG. 4 is a schematic diagram of an alternative space object provided by an exemplary embodiment of the present disclosure. As illustrated in FIG. 4, assuming that the preset intra-group quantity threshold is 4, the first space object is No. 1 elevator, the first quantity is 5, that is, the first quantity is larger than the preset intra-group quantity threshold, the alternative space object other than the first space object is the No. 2 elevator and the No. 3 elevator, in which the fifth quantity of the third object that enters the spatial region corresponding to the alternative space object 1 is 4, and the fifth quantity of the third object that enters the spatial region corresponding to the alternative space object 2 is 3, then in a plurality of the alternative space objects, the acquired third space object where the quantity of the third object entering the corresponding spatial region is less than the preset intra-group quantity threshold is the alternative space object 2 (the No. 3 elevator). According to the third space object displaying the corresponding seventh prompt information, specifically, it is allowed to be: displaying the prompt information such as “the elevator is overloaded, please leave the elevator, and take the No. 3 elevator” on the inside of the No. 1 elevator.

Further, the following in combination with specific scenarios, describes the technical solution provided by at least one embodiment of the present disclosure.

In the case where a virtual character corresponding to a player enters the bounding box within the elevator range (the spatial region corresponding to the first space object) in the virtual scene of the VR game, the quantity of the virtual character (the first object) existing in the elevator is automatically calculated and updated, or the quantity of the virtual character existing in the elevator is calculated and updated according to the preset cycle. In the case where the quantity of the virtual character does not exceed the maximum occupancy of the elevator (the preset intra-group quantity threshold), no processing is taken. In the case where the quantity of the virtual character equals to the maximum occupancy of the elevator, the prompting information prompts that the elevator is fully loaded, and reminds the virtual character who does not enters the elevator to take other elevators that are not full. In the case where the quantity of the virtual character exceeds the maximum occupancy of the elevator, the prompting information prompts that the elevator is overload, and prompts the virtual character in the elevator to take other elevators that are not full. Combined with the analysis of the quantity of the virtual object corresponding to the user in the virtual scene, executing the corresponding instruction implements the technical effect of giving feedback to a plurality of users in the case where a plurality of virtual objects corresponding to a plurality of users move in the virtual world in the VR scene, and improves the realism of the scene and improves the user experience.

Figure 5:
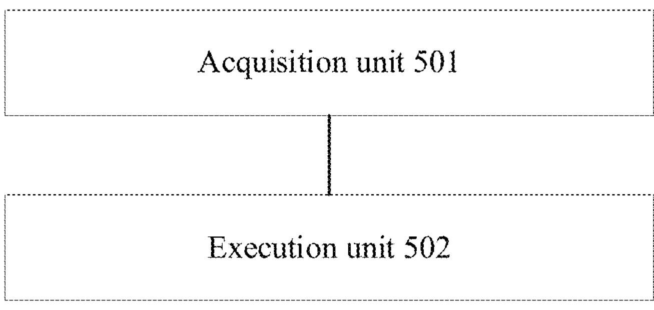
FIG. 5 is a structural schematic diagram of a data processing apparatus provided by an embodiment of the present disclosure.

FIG. 5 is a structural schematic diagram of a data processing apparatus provided by an exemplary embodiment of the present disclosure, and the apparatus 50 includes:

- an acquisition unit 501, which is configured to acquire the first quantity of the first object in a spatial region corresponding to the first space object, the first space object being an object in a current virtual scene, and the first object being a virtual object corresponding to a first user in the virtual scene; and
- an execution unit 502, which is configured to execute an instruction corresponding to the first space object and/or the first object in the case where the first quantity and a preset intra-group quantity threshold satisfy the first preset relationship.

In some optional embodiments of the present disclosure, the apparatus is further configured for: with respect to the alternative object in the virtual scene, performing a collision detection on the alternative object and the spatial region corresponding to the first space object, and obtaining a collision detection result for indicating whether the alternative object collides with the spatial region corresponding to the first space object; and according to the collision detection result, determining whether the alternative object is the first object entering the spatial region corresponding to the first space object.

In some optional embodiments of the present disclosure, the first space object is any alternative space object of a plurality of alternative space objects in the virtual scene.

In some optional embodiments of the present disclosure, in the case where the execution unit 502 is configured to execute an instruction corresponding to the first space object and/or the first object, the execution unit 502 is specifically configured for: executing a display instruction corresponding to the first space object and/or the first object.

In some optional embodiments of the present disclosure, in the case where the execution unit 502 is configured to execute an instruction corresponding to the first space object and/or the first object, the execution unit 502 is specifically configured for: executing an audio playback instruction corresponding to the first space object and/or the first object.

In some optional embodiments of the present disclosure, in the case where the execution unit 502 is configured to execute the instruction corresponding to the first space object, the execution unit 502 is specifically configured for adjusting the position information of the first space object; and in the case where the execution unit 502 is configured to execute the instruction corresponding to the first space object, the execution unit 502 is specifically configured for adjusting the position information and/or attitude information of the first object.

In some optional embodiments of the present disclosure, the apparatus 50 is further configured for:

- acquiring the second quantity of the second object entering the spatial region corresponding to the second space object, the second space object being an object in the virtual scene, and the second object being a virtual object corresponding to the second user in the virtual scene; and
- executing an instruction corresponding to the second space object and/or the second object in the case where the second quantity and the preset intra-group quantity threshold satisfy the first preset relationship.

In some optional embodiments of the present disclosure, the instruction corresponding to the first space object and/or the first object is related to the second object.

In some optional embodiments of the present disclosure, the apparatus 50 is further configured for acquiring the third quantity of the alternative object in the virtual scene, and the fourth quantity of the alternative space object, the alternative object being a virtual object corresponding to at least some users participating in the virtual scene; and determining the preset intra-group quantity threshold based on the third quantity and the fourth quantity.

In some optional embodiments of the present disclosure, in the case where the apparatus 50 is configured to determine the preset intra-group quantity threshold based on the third quantity and the fourth quantity, the apparatus 50 is specifically configured for performing a remainder operation on the fourth quantity based on the third quantity, and obtaining the remainder operation result; and determining the preset intra-group quantity threshold according to the remainder operation result.

In another aspect, the inventors of the present disclosure also noticed that, in a virtual scene, the type of a virtual object needs to be set in advance, and the type of the virtual object cannot be changed after the virtual scene has started to show; if the type of the virtual object needs to be changed, it is necessary to offline related programs and modify the development code, so it is inefficient to adjust the type of virtual object.

At least one embodiment of the application also provides a data processing method and apparatus, an electronic equipment and storage medium, which can solve the problem in related technologies, that is, in a virtual scene, the type of a virtual object needs to be set in advance, and the type of the virtual object cannot be changed after the virtual scene has started to show, but if the type of the virtual object needs to be changed, it is necessary to offline related programs and modify the development code, resulting in the problem of low efficiency in setting the type of the virtual object.

In the following, some terms in some embodiments of the present disclosure are explained for the convenience of those skilled in the art.

Bounding box: when solving the optimal bounding space of discrete point sets, bounding box can approximately replace the slightly larger geometry with simple characteristics of complex geometric objects.

Augmented Reality (AR): AR technology is a kind of technology that integrates virtual information with the real world, and it widely uses multimedia, three-dimensional modeling, real-time tracking and registration, intelligent interaction, sensing and other technical means, and applies computer-generated virtual information such as words, images, three-dimensional models, music and videos to the real world after simulation, so that the two kinds of information from the virtual world and the real world complement each other, thus realizing the augmentation to the real world. Virtual elements involved in an AR technology include, but are not limited to, images, videos and 3D models. For example, the goal of the AR technology is to connect the virtual world with the real world to interact on a screen.

Mixed Reality (MR): MR technology is a further development of virtual reality technology, and by introducing real scene information into virtual environment, this technology builds an interactive feedback information loop between virtual world, real world and a user, so as to enhance the realism of user experience. Mixed reality is a simulated scene that integrates computer-created sensory input (for example, a virtual object) with the sensory input from a physical scene or its representation. In some MR scenes, the computer-created sensory input can adapt to the change of sensory input from the physical scene. In addition, some electronic systems for presenting MR scenes can monitor the orientation and/or position with respect to the physical scenes, so that virtual objects can interact with real objects (i.e., physical elements from the physical scenes or their representations). For example, the system can monitor the movement so that the virtual plant appears stationary relative to the physical building.

The data processing method of this embodiment can also be realized by the system shown in FIG. 1, for example. As shown in FIG. 1, the system includes a head-mounted display device 10 and a control device 20. The head-mounted display device 10 and the control device 20 are connected through a network, for example, through a wired or wireless network connection.

In some embodiments, the control device 20 can be used to provide the display content for the head-mounted display device 10. When the head-mounted display device 10 displays the screen content received from the control device 20, the control device 20 can be used to perform the following data processing method: when it is determined that a first virtual object and a second virtual object meet a preset relationship, adjusting the type of the first virtual object to the type of the second virtual object, in which the first virtual object and the second virtual object are virtual objects in a virtual scene; when it is determined that the type of the first virtual object is the first preset type, executing an instruction corresponding to the first virtual object and the first preset type.

Alternatively, the scene can be any of the following scenes: virtual reality scene, mixed reality scene and augmented reality scene. For example, the scene can be a three-dimensional game scene.

Alternatively, the first virtual object and the second virtual object are displayed in a display screen in the current virtual scene, and the display screen is displayed on the display screen in the head-mounted display device 10; for example, the display screen can be a three-dimensional screen.

In another alternative embodiment, the data processing method can also be executed by the head-mounted display device 10 itself, and the system can also only include the head-mounted display device 10, that is, the head-mounted display device 10 is an all-in-one machine. At this time, the head-mounted display device 10 is used to adjust the type of the first virtual object to the type of the second virtual object when it is determined that the first virtual object and the second virtual object meet the preset relationship, in which the second virtual object and the first virtual object are virtual objects in the virtual scene. When it is determined that the type of the first virtual object is the first preset type, the instructions corresponding to the first virtual object and the first preset type are executed. The head-mounted display device 10 is provided with a display for displaying a display screen corresponding to a scene.

The detailed exemplary implementation of the data processing method and the specific exemplary functions of the head-mounted display device 10 or the control device 20 will be described in detail below. It should be noted that the description order of the following embodiments is not taken as a limitation on the priority order of the embodiments.

FIG. 6 is a flow chart of a data processing method provided by an exemplary embodiment of the present application. The execution body of this method may be conducted by the above-mentioned head-mounted display device 10 or by the control device 20. The method at least comprises the following steps S201-S202.

Step S201: When it is determined that the first virtual object and the second virtual object meet the preset relationship, the type of the first virtual object is adjusted to that of the second virtual object, which is the first preset type.

In some alternative embodiments, the virtual scene is any one of the following: virtual reality scene, mixed reality scene, augmented reality scene. For example, the scene can be a three-dimensional game scene.

Optionally, the first virtual object and the second virtual object are displayed in a display screen of a virtual scene, and the display screen is displayed on a display screen in a head-mounted display device, and the display screen can be a three-dimensional screen.

Alternatively, the first virtual object may be a virtual cartoon character of a first user wearing a head-mounted display device (that is, a user participating in a virtual scene) in a virtual scene, or a virtual camera corresponding to the first user in the scene.

Alternatively, the first virtual object can also be a scene object in the virtual scene, such as a button, a tree, a hammer, a stick, etc.

Alternatively, the second virtual object may be a virtual cartoon character of a second user wearing a head-mounted display device (that is, a user participating in the virtual scene) in the virtual scene, or a virtual camera corresponding to the second user in the scene.

Alternatively, the second virtual object can also be a scene object in the virtual scene, such as a button, a tree, a hammer, a stick, etc.

The first virtual object and the second virtual object may be not the same virtual object.

Optionally, with respect to how to determine whether the first virtual object and the second virtual object meet the preset relationship, the method further comprises: when the first virtual object contacts with the second virtual object, it is considered that the first virtual object and the second virtual object meet the preset relationship.

In some embodiments, the method further includes: when the collision box corresponding to the first virtual object and the collision box corresponding to the second virtual object meet the collision relationship, it is considered that the first virtual object is in contact with the second virtual object.

Alternatively, the collision box in this application may be a bounding box.

For example, a collision detection can be performed on the first virtual object and the second virtual object to obtain a collision detection result, and the collision detection result is used to indicate whether the collision box corresponding to the first virtual object and the collision box corresponding to the second virtual object satisfy the collision relationship.

For example, when the collision detection result indicates that the collision box corresponding to the first virtual object collides with the collision box corresponding to the second virtual object, it is determined that the collision box corresponding to the first virtual object and the collision box corresponding to the second virtual object satisfy the collision relationship. When the collision detection result indicates that the collision box corresponding to the first virtual object and the collision box corresponding to the second virtual object do not collide, it is determined that the collision box corresponding to the first virtual object and the collision box corresponding to the second virtual object do not satisfy the collision relationship.

Alternatively, it is also possible to determine whether the first virtual object is in contact with the second virtual object in other ways, which is not limited in this application.

Alternatively, the first preset type may be an electrically charged type. Alternatively, the first preset type may be a conductor and of an electrically charged type. Alternatively, the second virtual object may be a scene object: a power supply.

Figure 6A:
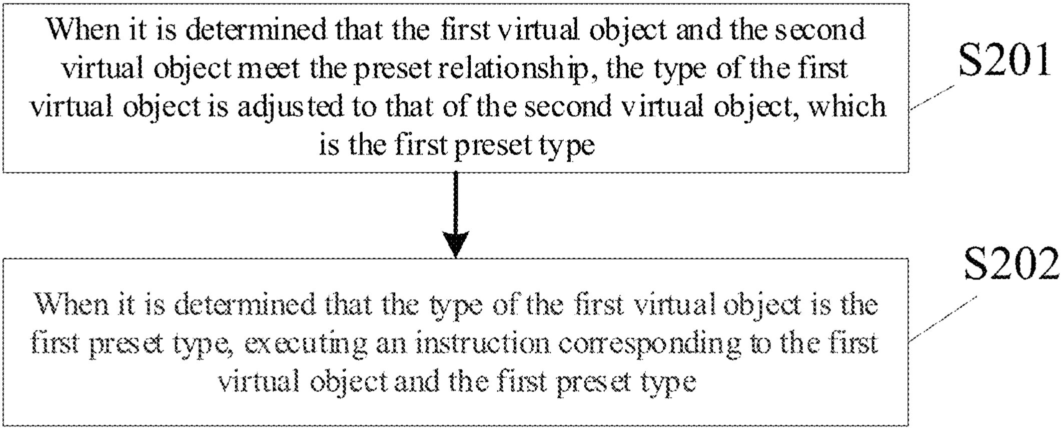
FIG. 6A is a flowchart of a data processing method provided by an exemplary embodiment of the present application.
Figure 6B:
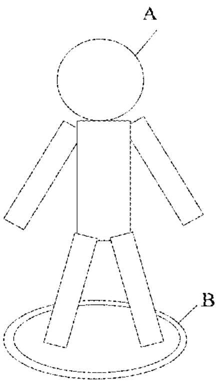
FIG. 6B is a schematic diagram showing a scene provided by an exemplary embodiment of the present application.

Further, as shown in FIG. 6B, the first virtual object may be a virtual cartoon character A corresponding to the first user, and the second virtual object may be a scene object B (specifically, a button). Then when it is determined that the character A is in contact with the scene object B, the type of the character A is adjusted to the type of the second virtual object, i.e., the electrically charged type.

In other alternative embodiments provided by the application, regarding how to determine that the first virtual object and the second virtual object satisfy the preset relationship, the method further comprises: when the first virtual object and the second virtual object belong to the same preset set, it is considered that the first virtual object and the second virtual object satisfy the preset relationship. For example, the preset set can be preset by relevant personnel.

In other alternative embodiments provided by the application, regarding how to determine that the first virtual object and the second virtual object satisfy the preset relationship, the method further comprises: when it is determined that the first virtual object and the third virtual object satisfy the preset relationship and that the second virtual object and the third virtual object satisfy the preset relationship, it is determined that the first virtual object and the second virtual object satisfy the preset relationship, wherein the third virtual object is a virtual object in a virtual scene, and the type of the third virtual object is the first preset type.

Optionally, the third virtual object is displayed in the display screen of the virtual scene, and the display screen is displayed on the display in the head-mounted display device; for example, the display screen can be a three-dimensional screen.

Alternatively, the third virtual object may be a virtual cartoon character of a third user wearing a head-mounted display device (i.e., a user participating in the virtual scene) in the virtual scene, or a virtual camera corresponding to the third user in the scene.

Optionally, the third virtual object can also be a scene object in the virtual scene, such as a button, a tree, a hammer, a stick, etc.

Optionally, the first user, the second user and the third user are not the same user.

Through the scheme of at least one embodiment of the present disclosure, a virtual object in a far distance can be activated; moreover, the scheme of the application supports multi-user participation, and has better flexibility and better user experience.

Optionally, with respect to how to determine whether the first virtual object and the third virtual object meet the preset relationship, the method further comprises: when the first virtual object contacts with the third virtual object, it is considered that the first virtual object and the third virtual object meet the preset relationship.

Optionally, when the first virtual object and the third virtual object belong to the same preset set, it is considered that the first virtual object and the third virtual object satisfy the preset relationship.

In some embodiments, the data processing method further includes: when the collision box corresponding to the first virtual object and the collision box corresponding to the third virtual object meet the collision relationship, it is considered that the first virtual object is in contact with the third virtual object.

For example, a collision detection can be performed on the first virtual object and the third virtual object to obtain a collision detection result, and the collision detection result is used to indicate whether the collision box corresponding to the first virtual object and the collision box corresponding to the third virtual object satisfy the collision relationship. For example, when the collision detection result indicates that the collision box corresponding to the first virtual object collides with the collision box corresponding to the third virtual object, it is determined that the collision box corresponding to the first virtual object and the collision box corresponding to the third virtual object satisfy the collision relationship. When the collision detection result indicates that the collision box corresponding to the first virtual object and the collision box corresponding to the third virtual object do not collide, it is determined that the collision box corresponding to the first virtual object and the collision box corresponding to the third virtual object do not satisfy the collision relationship.

Alternatively, it is also possible to determine whether the first virtual object is in contact with the third virtual object in other ways, which is not limited in this application.

Optionally, regarding how to determine whether the second virtual object and the third virtual object meet the preset relationship, the method further comprises: when the second virtual object contacts with the third virtual object, it is considered that the second virtual object and the third virtual object meet the preset relationship.

Optionally, when the second virtual object and the third virtual object belong to the same preset set, it is considered that the second virtual object and the third virtual object satisfy the preset relationship.

In some embodiments, the data processing method further includes: when the collision box corresponding to the second virtual object and the collision box corresponding to the third virtual object meet the collision relationship, it is considered that the second virtual object is in contact with the third virtual object.

For example, a collision detection can be performed on the second virtual object and the third virtual object to obtain a collision detection result, and the collision detection result is used to indicate whether the collision box corresponding to the second virtual object and the collision box corresponding to the third virtual object satisfy the collision relationship. For example, when the collision detection result indicates that the collision box corresponding to the second virtual object collides with the collision box corresponding to the third virtual object, it is determined that the collision box corresponding to the second virtual object and the collision box corresponding to the third virtual object satisfy the collision relationship. When the collision detection result indicates that the collision box corresponding to the second virtual object and the collision box corresponding to the third virtual object do not collide, it is determined that the collision box corresponding to the second virtual object and the collision box corresponding to the third virtual object do not satisfy the collision relationship.

Alternatively, it is also possible to determine whether the second virtual object is in contact with the third virtual object in other ways, which is not limited in this application.

Figure 6C:
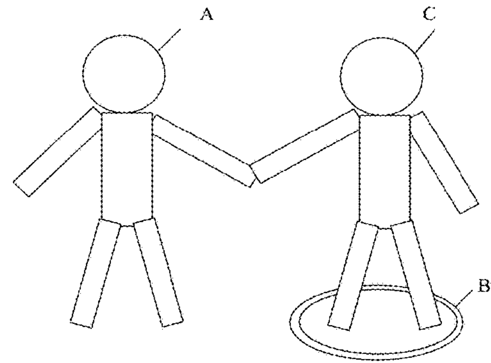
FIG. 6C is a schematic diagram showing another scene provided by an exemplary embodiment of the present application.

Further, as shown in FIG. 6C, the first virtual object can be a virtual cartoon character A corresponding to the first user, the second virtual object can be a scene object B (specifically, a button), the type of the second virtual object is the first preset type, and the type of the third virtual object is also the first preset type. The third virtual object may be a virtual cartoon character C corresponding to the third user. Then when it is determined that the character A is in contact with the character C and the character C is in contact with the scene object B, it is considered that the character A and the scene object B meet the preset relationship.

Optionally, the third virtual object includes a plurality of sub-virtual-objects.

In some embodiments, the third virtual object may include components, and each component may be regarded as a sub-virtual-object. For example, when the third virtual object is a scene object: a tea cup, the tea cup can include a cup cover and a cup body, and the cup cover and the cup body are two sub-virtual-objects. For another example, if the third virtual object is a scene object: a stick, and the stick may include a stick body and a grip part of the stick, and then the stick body and the grip part are two sub-virtual-objects respectively.

In at least one embodiment of the present disclosure, in the case that the third virtual object includes a plurality of sub-virtual objects, the interaction between the first virtual object, the third virtual object and the second virtual object can be made more flexible and more realistic, and the user experience is further improved.

In other alternative embodiments provided by the present application, regarding how to determine that the first virtual object and the second virtual object satisfy the preset relationship when the third virtual object includes a plurality of sub-virtual objects, the method further includes: when it is determined that the first virtual object and the first sub-virtual object among the plurality of sub-virtual objects satisfy the preset relationship, and that the second virtual object and the second sub-virtual object among the plurality of sub-virtual objects satisfy the preset relationship, determining that the first virtual object and the second virtual object satisfy the preset relationship.

For example, the first sub-virtual object and the second sub-virtual object may or may not be the same sub-virtual object.

Figure 6D:
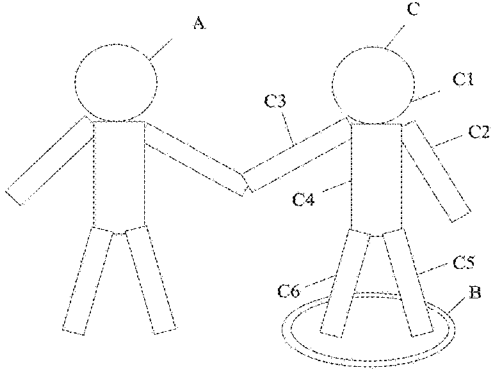
FIG. 6D is a schematic diagram showing another scene provided by an exemplary embodiment of the present application.

Optionally, as shown in FIG. 6D, the first virtual object is a virtual cartoon character A corresponding to the first user, the second virtual object can be a scene object B, the third virtual object is a virtual cartoon character C corresponding to the third user, and the third virtual object can include a plurality of sub-virtual objects C1, C2, C3, C4, C5 and C6.

Alternatively, the first sub-virtual object may be at least one sub-virtual object among THE sub-virtual objects, and the second sub-virtual object may be at least one sub-virtual object among the sub-virtual objects. For example, the first sub-virtual object may be the sub-virtual object C3 in FIG. 6D, and the second sub-virtual object may be the sub-virtual object C5 and/or C6 in FIG. 6D.

Optionally, regarding how to determine whether a first sub-virtual object in the plurality of sub-virtual objects meets a preset relationship with the first virtual object, the data processing method further comprises: when the first sub-virtual object in the plurality of sub-virtual objects contacts with the first virtual object, it is considered that the first sub-virtual object meets the preset relationship with the first virtual object.

In some embodiments, the data processing method further includes: when the collision box corresponding to the first sub-virtual object among the plurality of sub-virtual objects meets the collision relationship with the collision box corresponding to the first virtual object, it is considered that the first sub-virtual object among the plurality of sub-virtual objects is in contact with the first virtual object.

For example, a collision detection can be performed on the first virtual object and a first sub-virtual object among the plurality of sub-virtual objects to obtain a collision detection result, and the collision detection result is used to indicate whether a collision box corresponding to the first sub-virtual object among the plurality of sub-virtual objects and a collision box corresponding to the first virtual object satisfy a collision relationship. For example, when the collision detection result indicates that the collision box corresponding to the first sub-virtual object among the sub-virtual objects collides with the collision box corresponding to the first virtual object, it is determined that the collision box corresponding to the first sub-virtual object among the sub-virtual objects meets the collision relationship. When the collision detection result indicates that the collision box corresponding to the first sub-virtual object among the plurality of sub-virtual objects does not collide with the collision box corresponding to the first virtual object, it is determined that the collision box corresponding to the first sub-virtual object among the plurality of sub-virtual objects does not meet the collision relationship.

Alternatively, it can be determined whether the first sub-virtual object among the plurality of sub-virtual objects is in contact with the first virtual object by other ways, which is not limited in this application.

In other alternative embodiments provided by the present application, regarding how to determine that the first sub-virtual object in the plurality of sub-virtual objects meets the preset relationship with the first virtual object, the method further comprises: when the first sub-virtual object in the plurality of sub-virtual objects and the first virtual object belong to the same preset set, it is considered that the first sub-virtual object in the plurality of sub-virtual objects meets the preset relationship with the first virtual object.

Optionally, regarding how to determine whether a second sub-virtual object and a second virtual object in the plurality of sub-virtual objects meet a preset relationship, the method further comprises: when the second sub-virtual object in the plurality of sub-virtual objects contacts the second virtual object, it is considered that the second sub-virtual object and the second virtual object in the plurality of sub-virtual objects meet the preset relationship.

In some embodiments, the data processing method further includes: when the collision box corresponding to the second sub-virtual object among the plurality of sub-virtual objects meets the collision relationship with the collision box corresponding to the second virtual object, it is considered that the second sub-virtual object among the plurality of sub-virtual objects is in contact with the second virtual object.

For example, a collision detection can be performed on the second virtual object and the second sub-virtual object among the sub-virtual objects to obtain a collision detection result, and the collision detection result is used to indicate whether a collision box corresponding to the second sub-virtual object among the sub-virtual objects and a collision box corresponding to the second virtual object satisfy a collision relationship. For example, when the collision detection result indicates that the collision box corresponding to the second sub-virtual object among the sub-virtual objects collides with the collision box corresponding to the second virtual object, it is determined that the collision box corresponding to the second sub-virtual object among the sub-virtual objects meets the collision relationship. When the collision detection result indicates that the collision box corresponding to the second sub-virtual object among the sub-virtual objects does not collide with the collision box corresponding to the second virtual object, it is determined that the collision box corresponding to the second sub-virtual object among the plurality of sub-virtual objects does not meet the collision relationship.

Alternatively, it can be determined whether the second sub-virtual object among the plurality of sub-virtual objects is in contact with the second virtual object by other ways, which is not limited in this application.

In other alternative embodiments provided by the application, regarding how to determine that the second virtual object and the second sub-virtual object in the plurality of sub-virtual objects meet the preset relationship, the data processing method further comprises: when the second virtual object and the second sub-virtual object in the plurality of sub-virtual objects belong to the same preset set, it is considered that the second virtual object and the second sub-virtual object in the plurality of sub-virtual objects meet the preset relationship.

In other alternative embodiments provided by the application, when the third virtual object includes a plurality of sub-virtual objects, regarding how to determine that the third virtual object and the second virtual object meet the preset relationship, the data processing method further includes: determining that the third virtual object and the second virtual object meet the preset relationship when a collision box corresponding to any of the sub-virtual objects collides with a collision box corresponding to the second virtual object.

In other alternative embodiments provided by the application, when the third virtual object includes a plurality of sub-virtual objects, regarding how to determine that the third virtual object and the first virtual object meet the preset relationship, the data processing method further includes: determining that the third virtual object and the first virtual object meet the preset relationship when a collision box corresponding to any of the sub-virtual objects collides with the collision box corresponding to the first virtual object.

In some alternative embodiments provided by the application, the third virtual object is a user avatar, and the position and posture of the collision box corresponding to each sub-virtual object in the third virtual object are determined according to the skeletal unit of the user avatar.

Alternatively, the user avatar may include a plurality of bone units, each of which corresponds to each sub-virtual object, or the bone units are sub-virtual objects.

For example, referring to FIG. 6D, the third virtual object C includes a plurality of skeletal units, which may be a head unit, a left upper limb unit, a right upper limb unit, a trunk unit, a left lower limb unit and a right lower limb unit. The sub-virtual object C1 in the third virtual object corresponds to the head unit, the sub-virtual object C2 corresponds to the left upper limb unit, the sub-virtual object C3 corresponds to the right upper limb unit, the sub-virtual object C4 corresponds to the trunk unit, the sub-virtual object C5 corresponds to the left lower limb unit, and the sub-virtual object C6 corresponds to the right lower limb unit.

For example, as shown in FIG. 6D, the bone unit can also be a sub-virtual object, and a plurality of bone units included in the third virtual object C can be a head unit C1, a left upper limb unit C2, a right upper limb unit C3, a trunk unit C4, a left lower limb unit C5 and a right lower limb unit C6.

In at least some embodiments of the present application, the user can control the movement of the bone unit of the third virtual object and control the corresponding collision box through a controller, so as to complete the type setting of the first virtual object and/or the third virtual object. The type setting mode is more convenient, and the bone units conducting the collisions can be disconnected from each other, but the sense of conduction based on the virtual human body can be realized, which makes the user feel more immersed.

In some optional embodiments provided by the application, the data processing method further comprises: when it is determined that the third virtual object and the second virtual object meet the preset relationship, determining that the third virtual object is the first preset type, and executing instructions corresponding to the third virtual object and the first preset type.

Optionally, the executing instructions corresponding to the third virtual object and the first preset type, includes: displaying an animation special effect corresponding to the third virtual object and the first preset type, and/or playing a sound special effect corresponding to the third virtual object and the first preset type.

Optionally, the animation special effect corresponding to the third virtual object and the first preset type can be an electric current flowing animation special effect or a lightning animation special effect, and the sound special effect corresponding to the third virtual object and the first preset type can be a special effect simulating current sound, which can be flexibly set by a relevant personnel, and this is not specifically limited in this application.

In some optional embodiments provided by the application, the data processing method further comprises: acquiring a first setting instruction for the type of the second virtual object by a relevant personnel through the virtual object type setting interface; according to the first setting instruction, setting the type of the second virtual object to be the first preset type.

Because the virtual scene is different from the real world, the electrification in the virtual scene is virtual. In order to achieve the electrification effect of virtual objects in a computer game, it is necessary to simulate the real scene in the virtual scene, establish a conductive system, and configure the charged attributes on the virtual objects corresponding to the players. Some embodiments of the application can set the attributes of virtual objects (virtual cartoon characters corresponding to any user, virtual cameras corresponding to any user and scene objects).

Figure 6E:
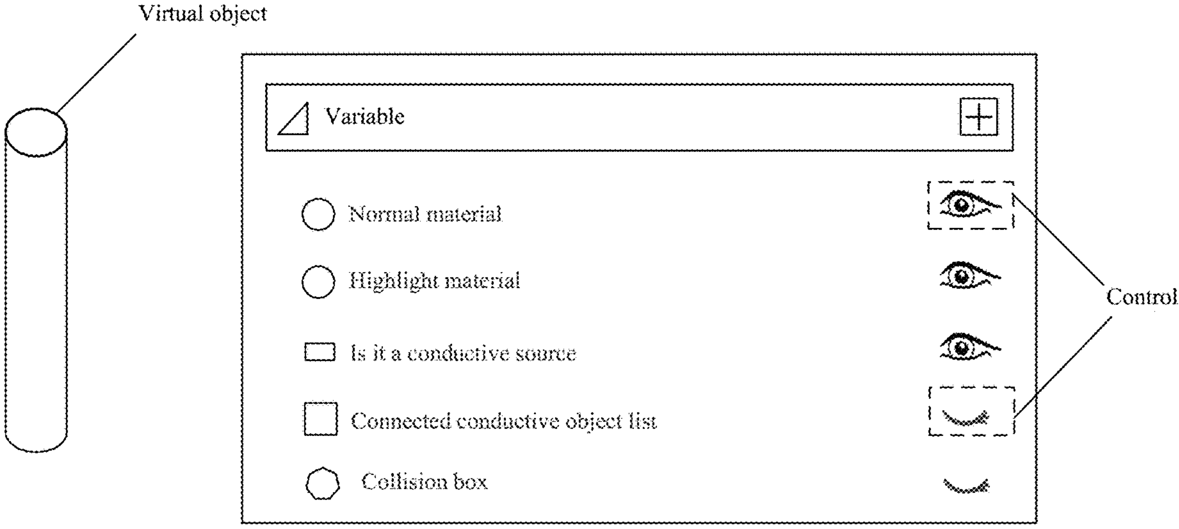
FIG. 6E is a schematic diagram of a virtual object type setting interface provided by an exemplary embodiment of the present application.

For example, refer to FIG. 6E, which is a schematic diagram of an attribute setting interface of a virtual object provided by an exemplary embodiment of the present application, in which "Normal material" represents the material expression of the virtual object and the material itself when they are not conductive; "Highlight material" represents change of the material of the virtual object when it conducts electricity, for example, after the type of the virtual object is the electrically charged type, the animation effect of electrical current flow is displayed on the surface of the virtual object; "Is it a conductive source" indicates whether the virtual object has its own current, and if this value is "True", it indicates that the type of the virtual object is the electrically charged type; "Connected conductive object list" represents the list of other conductive objects directly connected with the virtual object in the virtual scene, that is, the creation function for the contact object list below; "Collision box" represents the collision box of this virtual object, if it collides with another virtual object, it will be added to the list, and when the other virtual object runs away from the virtual object, it will be removed from the list. The controls in the property setting interface are used for a relevant personnel to turn on or off related functions. For example, the control can be an "eye" control; when the "eyes" are open, it is considered ON, and when the "eyes" are closed, it is considered OFF. For example, when the control corresponding to "Is it a conductive source" is ON, the value is regarded as "True".

Figure 6F:
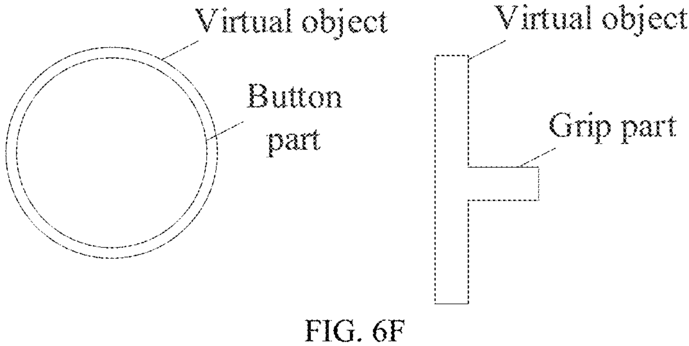
FIG. 6F is a schematic diagram of a virtual object attribute setting interface provided by an exemplary embodiment of the present application.

Optionally, at least some embodiments of the application can also set a property of the touchable part in the virtual object, such as when the virtual object is a virtual object containing a button, the touchable part is the button part; another example is that when the virtual object is a stick with a grip part, the touchable part is the grip part. As shown in FIG. 6F, FIG. 6F is a schematic diagram of a virtual object including a grip portion.

In some optional embodiments of the present application, the data processing method further comprises the following steps S01-S04.

Step S01: obtaining a plurality of candidate virtual objects.

Step S02: as for each candidate virtual object among the plurality of candidate virtual objects, and, by generating a contact object list corresponding to the candidate virtual object according to the target virtual object, obtaining a target virtual object in contact with the candidate virtual object, and obtaining a plurality of contact object lists corresponding to the plurality of candidate virtual objects.

For example, the candidate virtual objects can be virtual objects in the virtual scene, such as virtual cartoon characters, scene objects and the like.

For example, as for a candidate virtual object A, if a candidate virtual object L, a candidate virtual object F and a candidate virtual object C are in contact with the candidate virtual object A, then the candidate virtual object L, the candidate virtual object F and the candidate virtual object C are target virtual objects in contact with the candidate virtual object A.

Optionally, a contact object list includes one or more target virtual objects.

The generating a contact object list corresponding to the candidate virtual object according to the target virtual object, comprises: taking the target virtual object as an object in the contact object list corresponding to the candidate virtual object.

Optionally, each candidate virtual object corresponds to one contact object list.

For example, the contact object list corresponding to the candidate virtual object A includes candidate the virtual object L, the candidate virtual object F, and the candidate virtual object C.

Step S03: traversing a plurality of contact object lists, and taking the contact object lists containing the same fifth virtual object in the plurality of contact object lists as the first object list to be processed.

For example, there may be more than one the first list of object to be processed.

In some alternative embodiments, a plurality of contact object lists can be grouped according to whether the contact object lists contain the same fifth virtual object, and each group is regarded as a first object list to be processed.

For example, in a plurality of contact object lists in a first to-be-processed object list, in any contact object list, at least one contact object list and the remaining contact object list contain the same fifth virtual object.

In some alternative embodiments, the plurality of contact object lists can be grouped according to whether the contact object lists contain the same fifth virtual object, and each group is regarded as a first object list to be processed.

For example, in the plurality of contact object lists in a first object list to be processed, as for any contact object list, at least one contact object list in the remaining contact object lists contains the same fifth virtual object as this contact object list.

Step S04: generating a corresponding graph according to the first object list to be processed, in which the graph includes a plurality of sixth virtual objects.

For example, the first object list to be processed corresponds to the graph one by one. Optionally, in the graph, each sixth virtual object corresponds to a node, and the adjacency between nodes indicates the contact of the corresponding sixth virtual objects. Optionally, the contact object list corresponding to the candidate virtual object can also include the candidate virtual object itself.

In some alternative embodiments, the contact objects list includes the following examples:

(1) The contact object list corresponding to the candidate virtual object A: the candidate virtual object A, the candidate virtual object L, the candidate virtual object F and the candidate virtual object C.

(2) The contact object list corresponding to the candidate virtual object L: the candidate virtual object L, the candidate virtual object A and the candidate virtual object M.

(3) The contact object list corresponding to the candidate virtual object M: the candidate virtual object M, the candidate virtual object L, the candidate virtual object J and the candidate virtual object B.

(4) The contact object list corresponding to the candidate virtual object F: the candidate virtual object F and the candidate virtual object A.

(5) The contact object list corresponding to the candidate virtual object C: the candidate virtual object C and the candidate virtual object A.

(6) The contact object list corresponding to the candidate virtual object J: the candidate virtual object M and the candidate virtual object J.

(7) The contact object list corresponding to the candidate virtual object B: the candidate virtual object M and the candidate virtual object B.

(8) The contact object list corresponding to candidate virtual object D: the candidate virtual object D and the candidate virtual object E.

(9) The contact object list corresponding to the candidate virtual object E: the candidate virtual object E and the candidate virtual object D.

(10) The contact object list corresponding to candidate virtual object G: the candidate virtual object G, the candidate virtual object K and the candidate virtual object I.

(11) The contact object list corresponding to candidate virtual object K: the candidate virtual object K, the candidate virtual object G, and the candidate virtual object H.

(12) The contact object list corresponding to the candidate virtual object H: the candidate virtual object H and the candidate virtual object K.

(13) The contact object list corresponding to the candidate virtual object I: the candidate virtual object I and the candidate virtual object G.

Figure 6G:
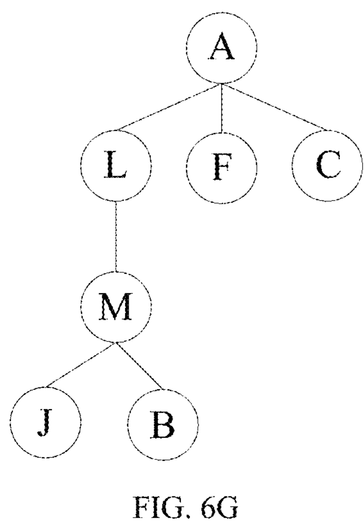
FIG. 6G is a schematic diagram of a diagram provided by an exemplary embodiment of the present application.
Figure 6H:
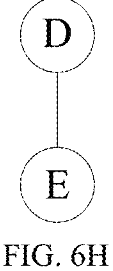
FIG. 6H is a schematic diagram of another diagram provided by an exemplary embodiment of the present application.

In the plurality of contact object lists, lists (1), (2), (3), (4), (5), (6) and (7) form a first object list to be processed; lists (8) and (9) form a first list of objects to be processed; and lists (10), (11), (12) and (13) form a first list of objects to be processed. Among them, a first list of objects to be processed including lists (1), (2), (3), (4), (5), (6) and (7) is shown in FIG. 6G. The graph corresponding to the first list of objects to be processed including lists (8) and (9) is shown in FIG. 6H. The graph corresponding to the first list of objects to be processed including lists (10), (11), (12) and (13) is shown in FIG. 6I.

Further, with respect to the plurality of first object lists to be processed, the data processing method further comprises: merging the graphs corresponding to a plurality of second object lists containing seventh virtual objects, belonging to the same preset set, in the plurality of first object lists to the same graph. At this time, the plurality of first object lists to be processed correspond to one graph.

Alternatively, when the candidate virtual object A and the candidate virtual object D both belong to one preset set. The graph in FIG. 6G and the graph in FIG. 6H are merged into the same graph.

Figure 6I:
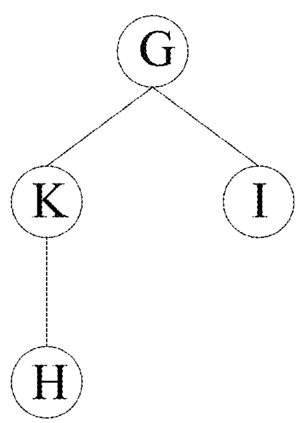
FIG. 6I is a schematic diagram of another diagram provided by an exemplary embodiment of the present application.
Figure 6J:
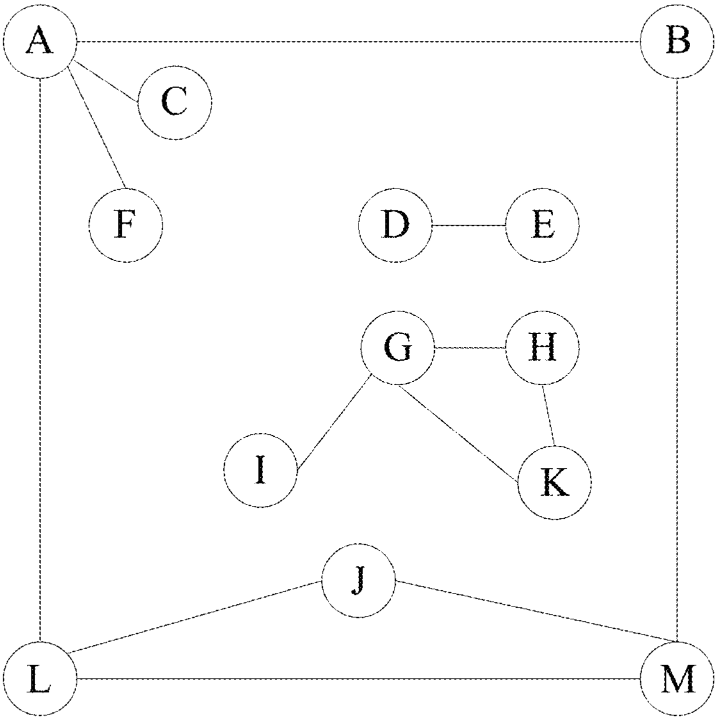
FIG. 6J is a schematic diagram of another diagram provided by an exemplary embodiment of the present application.

In some other embodiments, as shown in FIG. 6J, which is a merged graph, the relationship between some candidate virtual objects in FIG. 6J is different from that in FIG. 6G, FIG. 6H and FIG. 6I, the description of which will not be repeated here.

Optionally, the data processing method further comprises the following steps S81-S83:

Step S81: obtaining the target graph to which the second virtual object belongs. Optionally, the graph containing the second virtual object is the target graph.

Step S82: obtaining a plurality of fourth virtual objects in the target graph, wherein the fourth virtual objects are all the sixth virtual objects included in the target graph.

Step S83: when it is determined that the plurality of fourth virtual objects contain virtual objects of the first preset type, the second virtual object is determined to be the first preset type.

Optionally, the method further comprises the following steps S801-S803:

Step S801: obtaining the target graph to which the second virtual object belongs. Optionally, the graph containing the second virtual object is the target graph.

Step S802: obtaining a third list to be processed corresponding to the target graph, wherein the third list to be processed corresponding to the target graph is the first list to be processed for generating the target graph.

Step S803: determining whether the second virtual object is of the first preset type according to the third list to be processed.

Optionally, when there are a plurality of third lists to be processed, determining whether the second virtual object is of the first preset type according to the third list to be processed, includes: obtaining one of the third lists to be processed as the list to be analyzed; acquiring one sixth virtual object in the list to be analyzed as an object to be analyzed; determining whether the type of the object to be analyzed is the first preset type or not, if yes, determining that the second virtual object is of the first preset type and ending the process, but if not, taking one sixth virtual object among the remaining sixth virtual objects in the list to be analyzed as the object to be analyzed; returning to determine whether the type of the object to be analyzed is the first preset type or not until all the sixth virtual objects in the list to be analyzed are traversed, if all the sixth virtual objects in the list to be analyzed are not of the first preset type, acquiring one of the remaining third lists to be processed in the third lists to be processed as the list to be analyzed, and returning to acquire one sixth virtual object in the list to be analyzed as the object to be analyzed, until the traversal of the plurality of third lists to be processed is completed, if no sixth virtual object of the first preset type does not exist in each of the third lists to be processed, it is determined that the second virtual object is not of the first preset type.

Optionally, the graph in the application is an undirected graph, and when there is one sixth virtual object in the graph that is of the first preset type, it can be determined that the types of all the sixth virtual objects in the graph are of the first preset type.

Step S202: When it is determined that the type of the first virtual object is the first preset type, executing an instruction corresponding to the first virtual object and the first preset type.

Optionally, the executing an instruction corresponding to the first virtual object and the first preset type, includes: displaying an animation special effect corresponding to the first virtual object and the first preset type and/or playing a sound special effect corresponding to the first virtual object and the first preset type.

Optionally, the animation special effect corresponding to the first virtual object and the first preset type can be an electrical current flow animation effect or a lightning animation effect, and the sound special effect corresponding to the first virtual object and the first preset type can be an effect simulating the sound of an electrical current, which can be flexibly set by a relevant personnel, and this application is not specifically limited in this aspect.

In some embodiments provided by the application, the data processing method further comprises: when it is determined that the first virtual object and the second virtual object no longer meet the preset relationship, stopping executing the instruction corresponding to the first virtual object and the first preset type.

For example, when it is determined that the first virtual object and the second virtual object no longer satisfy the preset relationship, the type of the first virtual object becomes the second preset type. For example, the second preset type is an electrically uncharged type. Optionally, the second preset type is a conductor and of an electrically uncharged type.

Optionally, regarding how to determine that the first virtual object and the second virtual object no longer meet the preset relationship, the data processing method further comprises: when the first virtual object and the second virtual object no longer contact, it is considered that the first virtual object and the second virtual object no longer meet the preset relationship.

In some embodiments, the data processing method further includes: when the collision box corresponding to the first virtual object and the collision box corresponding to the second virtual object do not satisfy the collision relationship, it is considered that the first virtual object and the second virtual object are no longer in contact.

For example, the collision detection can be performed on the first virtual object and the second virtual object to obtain a collision detection result, and the collision detection result is used to indicate whether the collision box corresponding to the first virtual object and the collision box corresponding to the second virtual object satisfy the collision relationship.

For example, when the collision detection result indicates that the collision box corresponding to the first virtual object collides with the collision box corresponding to the second virtual object, it is determined that the collision box corresponding to the first virtual object and the collision box corresponding to the second virtual object satisfy the collision relationship. When the collision detection result indicates that the collision box corresponding to the first virtual object and the collision box corresponding to the second virtual object do not collide, it is determined that the collision box corresponding to the first virtual object and the collision box corresponding to the second virtual object do not satisfy the collision relationship.

Alternatively, it is also possible to determine whether the first virtual object is in contact with the second virtual object in other ways, which is not limited in this application.

In at least one embodiment, when it is determined that the first virtual object and the second virtual object meet the preset relationship, the type of the first virtual object is adjusted to that of the second virtual object, which is the first preset type, and when it is determined that the type of the first virtual object is the first preset type, an instruction corresponding to the first virtual object and the first preset type is executed, thus the embodiment can automatically adjust the type of the current virtual object through the type of another object in the process of displaying the virtual scene, without off-lining the related program and modifying the codes, and therefore simplifies the process of adjusting the type of the virtual object and effectively improves the efficiency of setting the type of the virtual object in the virtual scene.

At least one embodiment of the application can conduct electrical current through the interactions between the virtual objects in a virtual scene, and conduct electricity among a plurality of virtual objects to connect virtual objects that are separated away, thereby adjusting the type of a remote virtual object to a first preset type to activate a remote scene object.

Figure 7:
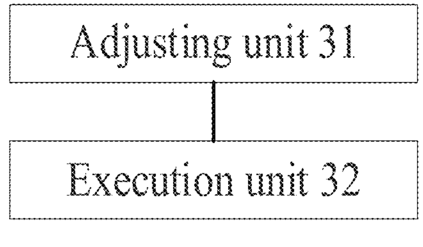
FIG. 7 is a schematic structural diagram of a data processing device provided by an exemplary embodiment of the present application.

FIG. 7 is a schematic structural diagram of a data processing device provided by an exemplary embodiment of the present application. As shown, the data processing device includes:

- an adjusting unit 31, configured to adjust the type of the first virtual object to the type of the second virtual object when it is determined that the first virtual object and the second virtual object meet the preset relationship, wherein the second virtual object and the first virtual object are virtual objects in a virtual scene, and the type of the second virtual object is the first preset type; and
- an execution unit 32, configured to execute an instruction corresponding to the first virtual object and the first preset type when it is determined that the type of the first virtual object is the first preset type.

In some optional embodiments provided by the present application, the data processing device is further configured to take the first virtual object and the second virtual object as satisfying a preset relationship when the first virtual object contacts the second virtual object.

In some optional embodiments provided by the application, the data processing device is further configured to take the first virtual object as being in contact with the second virtual object when the collision box corresponding to the first virtual object and the collision box corresponding to the second virtual object meet the collision relationship.

In some optional embodiments provided by the application, the data processing device is further configured to take the first virtual object and the second virtual object as satisfying a preset relationship when the first virtual object and the second virtual object belong to the same preset set.

In some optional embodiments provided by the application, the data processing device is further configured to consider that the first virtual object and the second virtual object satisfy the preset relationship when it is determined that the first virtual object and the third virtual object satisfy the preset relationship and the second virtual object and the third virtual object satisfy the preset relationship, wherein the third virtual object is a virtual object in a virtual scene and the type of the third virtual object is the first preset type.

In some optional embodiments provided by the present application, the third virtual object includes a plurality of sub-virtual objects, and the data processing device is further configured to consider that the first virtual object and the second virtual object satisfy the preset relationship when it is determined that the first virtual object and the first sub-virtual object in the plurality of sub-virtual objects satisfy the preset relationship, and that the second virtual object and the second sub-virtual object in the plurality of sub-virtual objects satisfy the preset relationship.

In some optional embodiments provided by the application, the third virtual object comprises a plurality of sub-virtual objects, and the data processing device is further configured for determining that the third virtual object and the second virtual object meet the preset relationship when a collision box corresponding to any of the sub-virtual objects collides with a collision box corresponding to the second virtual object, and for determining that the third virtual object and the first virtual object meet the preset relationship when a collision box corresponding to any one of a plurality of sub-virtual objects collides with a collision box corresponding to the first virtual object.

In some optional embodiments provided by the application, the third virtual object is a user avatar, and the position and posture of the collision box corresponding to each sub-virtual object in the third virtual object are determined according to the skeletal unit of the user avatar.

In some optional embodiments provided by the present application, the data processing device is further configured to determine that the third virtual object is of a first preset type and execute an instruction corresponding to the third virtual object and the first preset type when it is determined that the third virtual object and the second virtual object satisfy a preset relationship.

In some optional embodiments provided by the application, the data processing device is further configured to stop executing the instruction corresponding to the first virtual object and the first preset type when it is determined that the first virtual object and the second virtual object no longer meet the preset relationship.

In some optional embodiments provided by the application, the data processing device is further configured for: obtaining a first setting instruction by a related person on the type of a second virtual object through a virtual object type setting interface; setting the type of the second virtual object to be the first preset type according to the first setting instruction.

In some alternative embodiments provided by the present application, the data processing device is further configured for: acquiring a target graph to which the second virtual object belongs; acquiring a plurality of fourth virtual objects in the target graph; and determining that the second virtual object is of the first preset type when it is determined that the plurality of fourth virtual objects contain the virtual objects of the first preset type.

In some alternative embodiments provided by the application, the data processing device is further configured for: acquiring a plurality of candidate virtual objects; as for each of the plurality of candidate virtual objects, obtaining a target virtual object contacting with the candidate virtual object, and, by generating a contact object list corresponding to the candidate virtual object according to the target virtual object, obtaining a plurality of contact object lists corresponding to the plurality of candidate virtual objects; traversing the plurality of contact object lists, and taking the contact object lists containing the same fifth virtual object in the plurality of contact object lists as first object lists to be processed; generating corresponding graphs according to the first object lists to be processed, wherein the graphs comprise a plurality of sixth virtual objects. For example, the first object lists to be processed correspond to the graphs one by one.

In some optional embodiments provided by the application, when there are first object lists, the data processing device is further configured to merge the graphs, corresponding to second object lists containing seventh virtual objects belonging to the same preset set in the first object lists, into the same graph.

In another aspect, at least some embodiments of the application provide a task adjustment method and device, a computer-readable storage medium and equipment.

For example, the task adjustment method of at least one embodiment can be executed by a terminal device or a server. The terminal device can be a headset, an augmented reality device, a virtual reality device, an augmented reality device and a mixed reality device, a smart phone, a tablet computer, a notebook computer, a touch screen, a game machine, a Personal Computer (PC), a Personal Digital Assistant (PDA) or the like terminal device, and the terminal device can also include a client, which can be a task application client, a browser client with a task program or an instant messaging client. The server can be an independent physical server, a server cluster or a distributed system including multiple physical servers, and a cloud server that provides basic cloud computing services such as cloud service, cloud database, cloud computing, cloud function, cloud storage, network service, cloud communication, middleware services, domain name services, security services, CDN, and big data and artificial intelligence platforms.

For example, when the task adjustment method runs in a terminal device, the terminal device stores a task application program and is used to present a virtual scene picture. The terminal device is used to interact with the user through the graphical user interface for such as downloading, installing, and running applications through the terminal device. The terminal device can provide a graphical user interface to the user in various ways, for example, the graphical user interface can be rendered and displayed on the display screen of the terminal device, or the graphical user interface can be presented through holographic projection. For example, the terminal device may include a touch screen for presenting the graphical user interface and receiving an operation instruction generated by the user who is acting on the graphical user interface, and include a processor for running the task, generating a graphical user interface, responding to the operation instruction and controlling the display of the graphical user interface on the touch screen.

For example, when the task adjustment method runs on a server, the task can be a cloud task, such as a cloud game. Cloud task refers to the task that is based on cloud computing. In the running mode of cloud task, the running body of task application and the presenting body of virtual scene picture are separated from each other, and the storage and running of task adjustment method are completed on the cloud task server. The presentation of virtual scene images is completed at the client of cloud task, and the client is mainly used for receiving and sending task data and presenting virtual scene images. For example, the client of cloud task can be a display device with a data transmission function near the user side, such as a headset, a mobile terminal, a TV set, a computer, a PDA, a personal digital assistant, etc., but the computer device for processing task data is a cloud task server in the cloud. When performing a task, the user operates the cloud task client to send an operation instruction to the cloud task server, and the cloud task server runs the task according to the operation instruction, encodes and compresses data such as virtual scene pictures, and returns them to the cloud task client through a network. Finally, the cloud task client decodes and outputs the virtual scene pictures.

The embodiments of the present application can be applied to various application scenarios such as Extended Reality (XR), Virtual Reality (VR), Augmented Reality (AR), Mixed Reality (MR). For example, the embodiments of the invention can be applied to application scenarios such as games, office work, and training.

In the embodiments of the present application, the virtual scene is a virtual scene that is displayed (or provided) when an application runs on a terminal or a server. Optionally, the virtual scene is a simulation environment for the real world, or a semi-simulated and semi-fictional virtual environment, or a purely fictional virtual environment. For example, a virtual scene is either a two-dimensional virtual scene or a three-dimensional virtual scene. For example, the virtual environment can be sky, land, ocean, etc., and here the land includes environmental elements such as desert and city. For example, a virtual scene is a scene with the complete game logic of virtual objects by user control.

In the embodiments of the application, a virtual object refers to a dynamic object that can be controlled in a virtual scene. Alternatively, the dynamic object can be a virtual character, a virtual animal, an animated character, etc. The virtual object is a character controlled by a player through an input device, or Artificial Intelligence (AI) agent set in a virtual battle environment through training, or a Non-Player Character (NPC) set in a virtual scene battle. Optionally, the virtual object is a virtual character competing in a virtual scene. Optionally, the number of virtual objects in the virtual scene battle is preset or dynamically determined according to the number of clients participating in the battle, which is not limited in the embodiments of the application.

In some embodiments, the user can control a virtual object to move in the virtual scene, for example, control the virtual object to run, jump, crawl, etc., and also control the virtual object to use the skills and virtual props provided by the application to fight with other virtual objects.

Extended Reality (XR): XR technology involves the concepts of Virtual Reality (VR), Augmented Reality (AR), and Mixed Reality (MR), and represents the technology that a user can interact with the virtual world and the real world in real time.

Augmented Virtuality (AV) scenery: AV scenery refers to a simulated scenery created by a computer or a virtual scenery incorporating at least one sensory input from a physical scenery. One or more sensory inputs from the physical scene may be a representation of at least one feature of the physical scene. For example, a virtual object may present the color of a physical element captured by one or more imaging sensors. As another example, a virtual object may exhibit characteristics consistent with actual weather conditions in a physical scene, as identified through weather-related imaging sensors and/or recorded by online weather data. In another example, a forest in augmented reality may have virtual trees and structures, but animals may have characteristics accurately reproduced from images taken for physical animals.

In the embodiments of the application, the virtual field of view refers to the area in the virtual environment that the user can perceive through the lens in the virtual reality device, and the perceived area is represented by angles of the field of view (FOV).

In the embodiments of the present application, a virtual reality device may refer to a terminal that can realize the virtual reality effect, and can usually be provided in the form of glasses, Head Mount Display (HMD), contact lenses for realizing visual perception, and other forms of perception. Of course, the form for realizing the virtual reality device is not limited to the above, and it can be further miniaturized or enlarged as needed.

The virtual reality devices described in the embodiments of the present application may include, but are not limited to, the following types: computer-side virtual reality (PCVR) devices, mobile virtual reality devices and all-in-one virtual reality devices.

A PC-side virtual reality (PCVR) equipment uses a PC-side device to perform the related calculation and data output of the virtual reality function, and the external virtual reality equipment uses the data output from the PC-side device to realize the virtual reality effect.

A mobile virtual reality equipment supports setting up a mobile terminal (such as smart phones) in various ways (such as head-mounted displays with special card slots). Through wired or wireless connection with the mobile terminal, the mobile terminal can perform relevant calculations of the virtual reality function and output data to the mobile virtual reality equipment, such as watching virtual reality videos through the mobile terminal's APP.

An all-in-one virtual reality equipment is equipped with a processor for the relevant calculation of the virtual reality function, so it has independent virtual reality input and output functions, and does not need to be connected with a PC or a mobile terminal, so it has high freedom of use.

Figure 8:
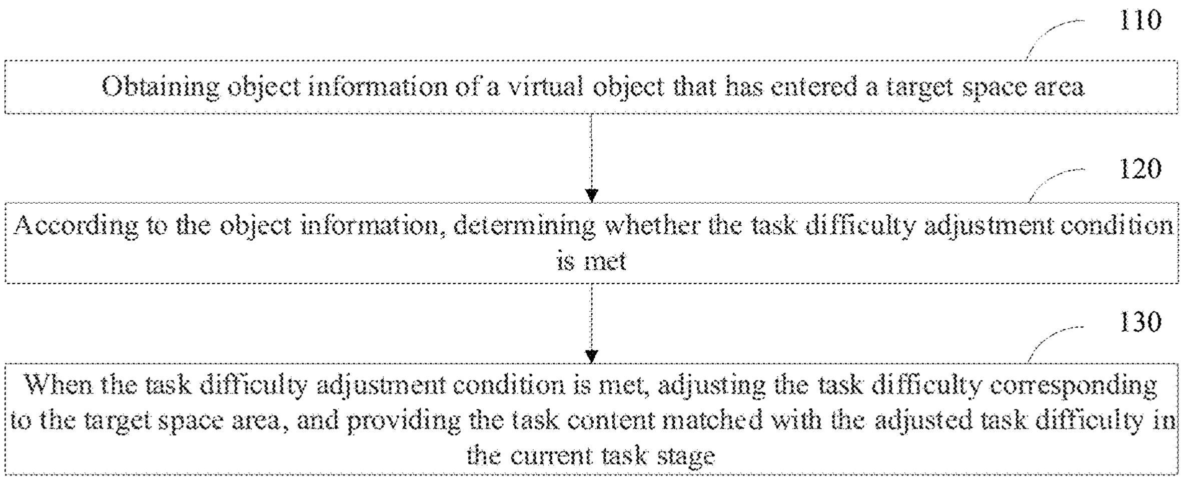
FIG. 8 is a flowchart of a task adjustment method provided by another embodiment of the present application.

FIG. 8 is a flowchart of a task adjustment method provided by at least one embodiment of the present application. The task adjustment method includes the following steps 110-130.

Step 110: obtaining object information of a virtual object that has entered a target space area.

For example, a virtual scene picture can be provided through a terminal device, and the picture displayed by the virtual scene picture can be a three-dimensional virtual scene picture in a game scene, and the three-dimensional virtual scene is a virtual environment provided when an application runs on the terminal device, which can be a simulation scene of the real world, a semi-simulation and semi-fiction scene, or a pure fiction scene. The scene picture displayed by the virtual scene picture is the scene picture presented when the virtual object observes the three-dimensional virtual scene.

For example, the virtual scene picture may include a virtual scene, and include a target space area contained in the virtual scene and a virtual object that has entered the target space area. The virtual object is a character controlled by a user through an input device, or an Artificial Intelligence (AI) agent set in a virtual environment battle through training, or a Non-Player Character (NPC) set in a virtual scene battle. The virtual scene picture can include a virtual object manipulated by the current user, and can also include other virtual object manipulated by other user. It can be understood that the graphical user interface includes not only the above-mentioned virtual objects, but also other contents in the virtual scene, which can be determined according to the specific scene contents, and is not limited here.

For example, the virtual scene may include but not limited to the following scenes: game virtual scene, office virtual scene, training virtual scene, training virtual scene, etc.

For example, at present, the user manipulates the virtual object in the virtual scene through the terminal device, and the virtual object can observe the three-dimensional virtual scene through the camera model. When in the first-person perspective, the camera model is located in the head or neck of the first virtual object, and only the arm part of the virtual object can be displayed in the graphical user interface. When in the third person perspective, the camera model is located behind the virtual object, and the upper body or the whole body of the virtual object can be displayed in the graphical user interface. Here, graphical user interface (GUI) is the environmental picture presented by observing the three-dimensional virtual environment from a certain perspective through the camera model.

For example, a virtual scene picture containing the target space area can be displayed through the terminal device. For example, a corresponding task can be performed in the target space area. For example, the task can be any one selected from the group consisting of a game task, an office task, a training task and a training task.

In some embodiments, the task adjustment method further includes: determining that the virtual object has entered the target space area when the virtual object meets the collision condition with the target space area.

For example, a first bounding box is constructed for the virtual object, and a second bounding box is constructed for the target space area. When it is detected that the bounding box corresponding to the virtual object overlaps with the second bounding box corresponding to the target space area, or when the bounding box corresponding to the virtual object enters the range of the second bounding box corresponding to the target space area, it can be determined that the virtual object meets the collision condition with the target space area, and it can be further determined that the virtual object has entered the target space area.

In some embodiments, the target spatial region is one of the spatial regions in the current virtual scene.

For example, there can be spatial regions in the current virtual scene, and each spatial region can be used to perform the same or different tasks. The target space area is one of the plurality of space areas in the current virtual scene, specifically, the target space area is the space area, where the first virtual object corresponding to the current user is located, in the plurality of space areas of the current virtual scene. It can be understood that when there are virtual objects corresponding to users in the current virtual scene, the virtual objects can respectively move in the space areas of the virtual scene according to the manipulation of different users, resulting in changes in the virtual objects in the space areas, and the task difficulty can be dynamically adjusted for one or more space areas in the virtual scene, so that the task difficulty can be adjusted more reasonably in a multi-user, multi-area or multi-task parallel scene.

In some embodiments, the object information includes the object number and/or object attribute.

For example, the object information of a virtual object that has entered the target space area is obtained, and the virtual object that has entered the target space area may include a first virtual object corresponding to the current user, or include a first virtual object corresponding to the current user and a second virtual object corresponding to other user, and the second virtual object includes at least one virtual object. The object information may include at least one of the object number and/or object attribute.

In some embodiments, the object attributes include at least one of the following: object type, object-related item, and object level. For example, the object type can be occupation, race, etc. For example, the object-related item can be virtual weapons, virtual prop, virtual pet, etc.

Step 120: according to the object information, determining whether the task difficulty adjustment condition is met.

For example, it can be determined whether the task difficulty adjustment condition is met according to the object number and/or object attribute.

Step 130: when the task difficulty adjustment condition is met, adjusting the task difficulty corresponding to the target space area, and providing the task content matched with the adjusted task difficulty in the current task stage.

In some embodiments, the determining whether the task difficulty adjustment condition is met or not according to the object information, includes: determining that the task difficulty adjustment condition is met when the number of objects matches a preset number threshold.

For example, the preset quantity threshold can be set according to the task requirement, and the preset quantity threshold exemplified in the embodiment of the application does not constitute a specific limitation on the content.

For example, when the number of objects is greater than or equal to the preset number threshold, it is determined that the number of objects matches the preset number threshold, and the task difficulty adjustment condition is further determined.

For example, if the preset number threshold is 3, when the number of virtual objects that have entered the target space area is 3, and the number of objects of the virtual objects matches the preset number threshold with the value of 3, it is determined that the task difficulty adjustment condition is met.

In some embodiments, when the task difficulty adjustment condition is met, the adjusting the task difficulty corresponding to the target space area, and the providing the task content matched with the adjusted task difficulty in the current task stage, includes: when the task difficulty adjustment condition is met, adjusting the task difficulty of the current task stage corresponding to all virtual objects in the target space area, and providing the task content matched with the adjusted task difficulty to all virtual objects in the current task stage.

For example, if it is determined whether the task difficulty adjustment condition is met according to the situation that the number of objects matches the preset number threshold, and when it is determined that the task difficulty adjustment condition is met, the task difficulty of the current task stage corresponding to all virtual objects in the target space area is adjusted, and the task content matched with the adjusted task difficulty is provided to all virtual objects in the current task stage. For example, if the current task phase corresponding to all virtual objects in the target space area involves the same task, the task content matching the adjusted task difficulty is the same task content for all virtual objects.

For example, taking a game task as an example, for example, if the preset number threshold is 3, the number of virtual objects entering the target space area can be dynamically detected. When it is detected that the number of virtual objects entering the target space area is greater than or equal to 3, the task difficulty of the current task stage corresponding to all virtual objects in the target space area can be adjusted, such as speeding up the movement of containers in the current game task and controlling some special types of containers to appear, so as to change the difficulty of the current game task and play a game that has more suitable difficulty for multi-players.

In some embodiments, when the task difficulty adjustment condition is met, the adjusting the task difficulty corresponding to the target space area is adjusted, and the providing the task content matched with the adjusted task difficulty in the current task stage, includes: when the task difficulty adjustment condition is met, the task difficulty of one or more sub-tasks, corresponding to each virtual object in the target space area in the current task stage is adjusted, in the current task stage, and providing all virtual objects with task contents matching the adjusted task difficulty, wherein the task contents matching the adjusted task difficulty are different sub-task contents for the sub-tasks corresponding to each virtual object.

For example, if it is determined whether the task difficulty adjustment condition is met or not according to the situation that the number of objects matches the preset number threshold, then when it is determined that the task difficulty adjustment condition is met, the task difficulty of one or more sub-tasks in the current task phase corresponding to each virtual object of all the virtual objects in the target space area is adjusted, and the task content matched with the adjusted task difficulty is provided to all the virtual objects in the current task phase. For example, if there are one or more sub-tasks corresponding to each virtual object of all the virtual objects in the target space area in the current task stage, and the task content corresponding to each virtual object is not necessarily the same under each sub-task, then the sub-task contents of the task content that matches the adjusted task difficulty may be different sub-task contents corresponding to each virtual object.

For example, in at least one embodiment of the present disclosure, the number of objects can be used as the judgment basis of the task difficulty adjustment condition, and the task difficulty of the current task stage corresponding to all the virtual objects in the target space area can be adjusted according to the change of the number of objects of virtual objects that have entered the target space area in the same target space area, so that the task challenge that is more in line with the multi-person difficulty can be carried out, so as to realize the dynamic difficulty adjustment (DDA) mechanism for a specific area.

In some embodiments, the determining whether the task difficulty adjustment condition is met or not according to the object information includes: determining whether there is a target virtual object meeting the task difficulty adjustment condition among the virtual objects according to the object attribute, in which the target virtual object is at least one of the virtual objects; when the task difficulty adjustment condition is met, the adjusting the task difficulty corresponding to the target space area, and the providing the task content matched with the adjusted task difficulty in the current task stage, includes: when the task difficulty adjustment condition is met, adjusting the task difficulty corresponding to the target virtual object in the target space area, and providing the task content matched with the adjusted task difficulty to the target virtual object in the current task stage, in which the task content matched with the adjusted task difficulty is different for different virtual object of the target virtual object.

For example, it can be determined whether there is a target virtual object that meets the task difficulty adjustment condition among the virtual objects that have entered the target space area according to the object attribute or not, and the target virtual object is at least one of the virtual objects. For example, the target virtual object is a virtual object, the object attribute of which is a preset attribute, among the virtual objects that have entered the target space area. When there is a target virtual object that meets the task difficulty adjustment condition among the virtual objects that have entered the target space area, it is determined that the task difficulty adjustment condition is met. When the task difficulty adjustment condition is met, the task difficulty of the current task stage corresponding to the target virtual object in the target space area is adjusted, and the task content matched with the adjusted task difficulty is provided to the target virtual object in the current task stage, and the task content matched with the adjusted task difficulty is different for different virtual object in the target virtual object.

For example, by taking an object attribute as the judgment basis of the task difficulty adjustment condition, it can be realized to distinguish a certain specific virtual object, the task difficulty of which needs to be dynamically adjusted, in the same target space area according to the object attribute of the virtual objects that have entered the target space area, so that a certain specific user can have a different task experience feeling from other user(s), so as to realize the dynamic difficulty adjustment mechanism for some specific users.

For example, it is also possible to determine whether the task difficulty adjustment conditions are met or not according to the number of objects and object attributes.

For example, when the number of objects matches the preset number threshold (that is, the number of objects is greater than or equal to the preset number threshold) and the task difficulty adjustment condition is met, the task difficulty of the current task stage corresponding to all virtual objects in the target space area is adjusted, and the task content matched with the adjusted task difficulty is provided to all virtual objects in the current task stage, and for example, the task content matched with the adjusted task difficulty is the same for all virtual objects.

For example, when the number of objects does not match the preset number threshold (that is, the number of objects is less than the preset number threshold), and there is a target virtual object that meets the task difficulty adjustment condition among the virtual objects that have entered the target space area, it is determined that the task difficulty adjustment condition is met, and then the task difficulty of the current task stage corresponding to the target virtual object in the target space area is adjusted, and the task content matching the adjusted task difficulty is provided to the target virtual object in the current task stage, and for example, the task content matching the adjusted task difficulty is different for different virtual object in the target virtual object.

For example, by using the number of objects and an object attribute as the basis for judging the adjustment conditions of task difficulty, the judgment is first conducted based on the number of objects in the same target space area. When the number of virtual objects that have entered the target space area is greater than or equal to the preset number threshold, the task difficulty of the current task stage corresponding to all virtual objects in the target space area is adjusted, which can be used to carry out the task challenge that is more in line with the multi-person difficulty and realize the dynamic difficulty adjustment mechanism for a specific area under the condition that the preset number meets the adjustment conditions of task difficulty.

Then, if the number of objects does not meet the task difficulty adjustment condition, the judgment can be further conducted based on the object attribute. When the number of virtual objects that have entered the target space area is less than the preset number threshold, and there is a target virtual object that meets the task difficulty adjustment condition, the task difficulty of the current task phase corresponding to the target virtual objects in the target space area is adjusted. If the preset number does not meet the task difficulty adjustment conditions, the dynamic difficulty adjustment mechanism for a specific user is realized based on the object attribute.

For example, the task adjustment method further includes: presetting the types of DDA mechanisms and DDA task contents corresponding to different types. For example, the types of DDA mechanisms include a DDA mechanism for a specific area and a DDA mechanism for a specific user. With respect to different types of corresponding DDA task contents, the corresponding DDA task contents can be selected for configuration from the candidate task contents. For example, taking a game task or a training task as an example, the candidate tasks are as follows: (a) change the moving speed of a virtual object, (b) change whether a specific virtual object appears, and (c) change the attribute of the virtual object and set whether the virtual object can be seen by the user.

For example, when the task difficulty adjustment condition is met, the corresponding DDA task content is triggered according to the type of the corresponding DDA mechanism to realize the task difficulty adjustment.

In some embodiments, the task adjustment method further includes: displaying a virtual scene picture containing the target space area through a terminal device, and displaying the task content matched with the adjusted task difficulty in the task execution picture.

In some embodiments, the terminal device includes any one of an augmented reality device, a virtual reality device, an augmented reality device and a mixed reality device.

All the above technical schemes can be combined in any possible way to form an alternative embodiment of the application, and the description for these alternative embodiments are omitted here for simplicity.

One or more embodiments of the application obtains the object information of the virtual object that has entered the target space area; according to the object information, it is determined whether the task difficulty adjustment condition is met or not; when the task difficulty adjustment condition is met, the task difficulty corresponding to the target space area is adjusted, and the task content matched with the adjusted task difficulty is provided in the current task stage. The embodiment(s) of the present application can reasonably adjust task difficulty so as to ensure the user's task experience and keep the task attractive.

In order to implement the task adjustment method of the embodiment(s) of the application, at least one embodiment of the application further provides a task adjustment device.

Figure 9:
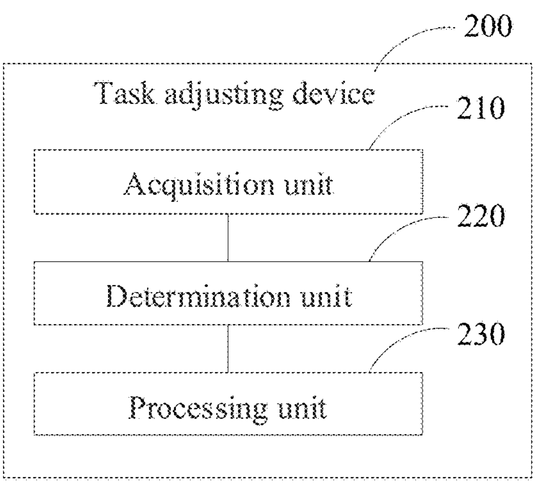
FIG. 9 is a structural schematic diagram of a task adjusting device provided by another embodiment of the present application.

FIG. 9 is a structural schematic diagram of a task adjusting device provided by an embodiment of the present application.

Referring to FIG. 9, the task adjusting device 200 may include an acquisition unit 210, a determination unit 220 and a processing unit 230. The acquisition unit 210 is configured to acquire object information of a virtual object that has entered a target space area; the determination unit 220 is configured to determine whether the task difficulty adjustment condition is met or not according to the object information; and the processing unit 230 is configured to adjust the task difficulty corresponding to the target space area when the task difficulty adjustment condition is met, and provide the task content matching the adjusted task difficulty in the current task stage.

In some embodiments, the obtaining unit 210 is further configured to determine that the virtual object has entered the target space area when the virtual object meets the collision condition with the target space area.

In some embodiments, the object information includes the number of objects and/or object attributes.

In some embodiments, the determining unit 220 can be configured to determine that the task difficulty adjustment condition is met when the number of objects matches the preset number threshold.

In some embodiments, the processing unit 230 can be configured to adjust the task difficulty of the current task phase corresponding to all virtual objects in the target space area when the task difficulty adjustment condition is met, and provide all virtual objects with the task content matching the adjusted task difficulty in the current task phase; and the task content matching the adjusted task difficulty is the same for all virtual objects.

In some embodiments, the processing unit 230 can be configured to adjust the task difficulty of one or more sub-tasks in the current task phase corresponding to each virtual object in the target space area when the task difficulty adjustment condition is met, and provide all virtual objects with task contents matching the adjusted task difficulty in the current task phase; and the task contents matching the adjusted task difficulty are sub-task content that are different for sub-tasks corresponding to each virtual object.

In some embodiments, the determining unit 220 can be configured to determine whether there is a target virtual object that meets the task difficulty adjustment condition among the virtual objects according to an object attribute, and the target virtual object is at least one of the virtual objects.

In some embodiments, the processing unit 230 can be configured to adjust the task difficulty of the current task phase corresponding to the target virtual object in the target space area when the task difficulty adjustment condition is met, and provide the target virtual object with the task content matched with the adjusted task difficulty in the current task phase; and the task content matched with the adjusted task difficulty is different for different virtual objects in the target virtual object.

In some embodiments, the object attribute includes at least one of the following: object type, object-related items, and object level.

In some embodiments, the target spatial region is one of a plurality of spatial regions in the current virtual scene.

In some embodiments, the task adjusting device 200 may further include a display unit, and the display unit is used to display a virtual scene picture containing the target space area through the terminal device, and the task execution screen displays the task content matching the adjusted task difficulty.

In some embodiments, the terminal device includes any one selected from the group consisting of an augmented reality device, a virtual reality device, an augmented reality device and a mixed reality device.

Each unit in the task adjusting device 200 can be realized in whole or in part by software, hardware, firmware or any combination thereof. The above-mentioned units can be embedded in or independent of the processor in the terminal device in the form of hardware, and can also be stored in the memory in the terminal device in the form of software, so that one or more processors can call and execute the operations corresponding to the above-mentioned units.

For example, the task adjusting device 200 can be integrated in a terminal or server with a storage and at least one processor, or the task adjusting device 200 can be the terminal or server by itself.

Figure 10:
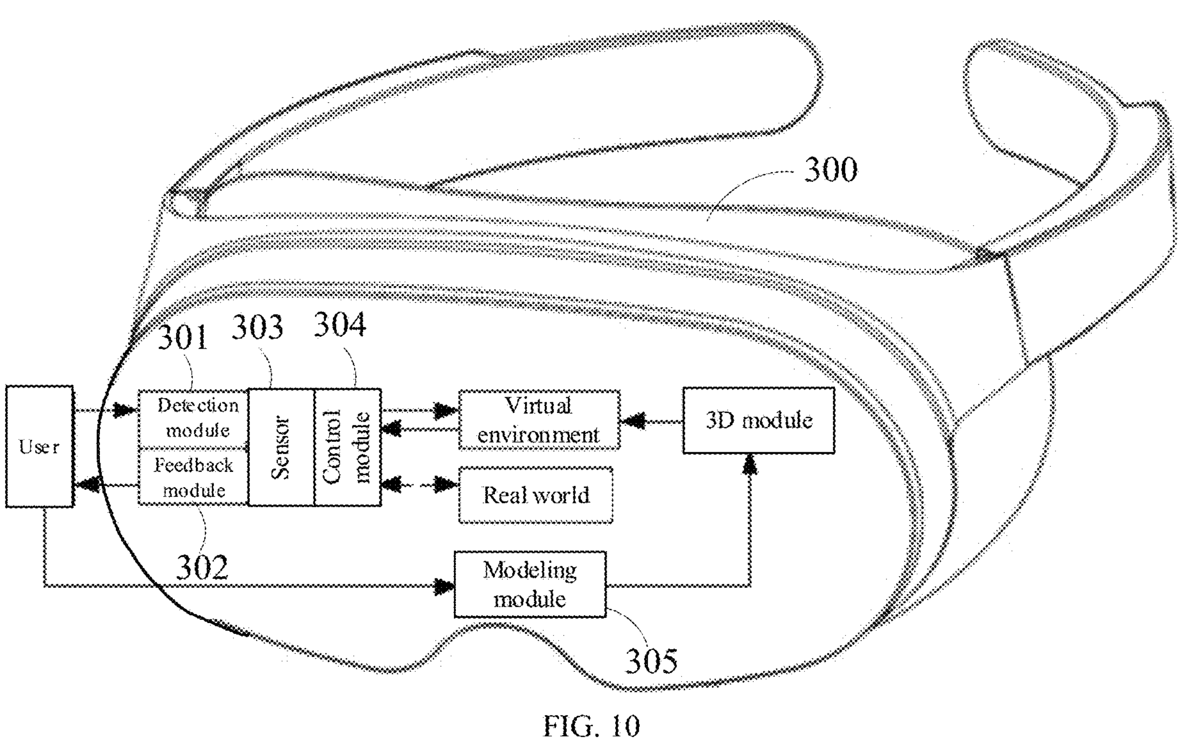
FIG. 10 is a first structural schematic diagram of a terminal device provided by another embodiment of the present application.

FIG. 10 is a schematic structural diagram of a terminal device provided by an embodiment of the present application.

As shown in FIG. 10, the terminal device 300 can usually be provided in the form of glasses, Head Mount Display (HMD), contact lenses for realizing visual perception, or other forms of perception. Of course, the form for realizing the terminal device is not limited to the above, and it can be further miniaturized or enlarged as needed. The terminal device 300 may include, but is not limited to, the following components: a detection module 301, a feedback module 302, a sensor 303, a control module 304 and a modeling module 305.

The detection module 301 can be configured to use various sensors to detect a user's operation command and act on a virtual environment, and for example, to constantly update the image displayed on the display screen following the user's sight, so as to realize the interaction between the user and the virtual scene, for example, constantly updating the displayed content based on the detected rotation direction of the user's head.

The feedback module 302 is configured to receive the data from the sensors and provide real-time feedback for the user. The feedback module 302 can be further configured for displaying a graphical user interface, such as displaying a virtual environment on the graphical user interface. For example, the feedback module 302 may include a display screen or the like.

The sensor 303 can be configured to, on the one hand, accept the operation command from the user and acts on the virtual environment, and, on the other hand, provide the results produced after the operation to the user in various forms of feedback.

The control module 304 can be configured to control the sensors and various input/output devices, including obtaining user's data (such as action and voice) and output perceptual data, such as image, vibration, temperature and sound, which have an effect on the user, the virtual environment and the real world.

The modeling module 305 can be configured to construct a three-dimensional model of the virtual environment, and may also include various feedback mechanisms such as sound and touch in the three-dimensional model.

In at least one embodiment of the present application, a virtual scene can be constructed by the modeling module 305. A graphical user interface is displayed by the feedback module 302, wherein the graphical user interface includes a virtual scene, a target space area contained in the virtual scene, and a virtual object that has entered the target space area. The object information of the virtual object that has entered the target space area is obtained by the detection module 301. The control module 304 determines whether the task difficulty adjustment condition is met according to the object information, and when the task difficulty adjustment condition is met, the task difficulty corresponding to the target space area is adjusted, and the task content matching the adjusted task difficulty is provided in the current task stage.

Figure 11:
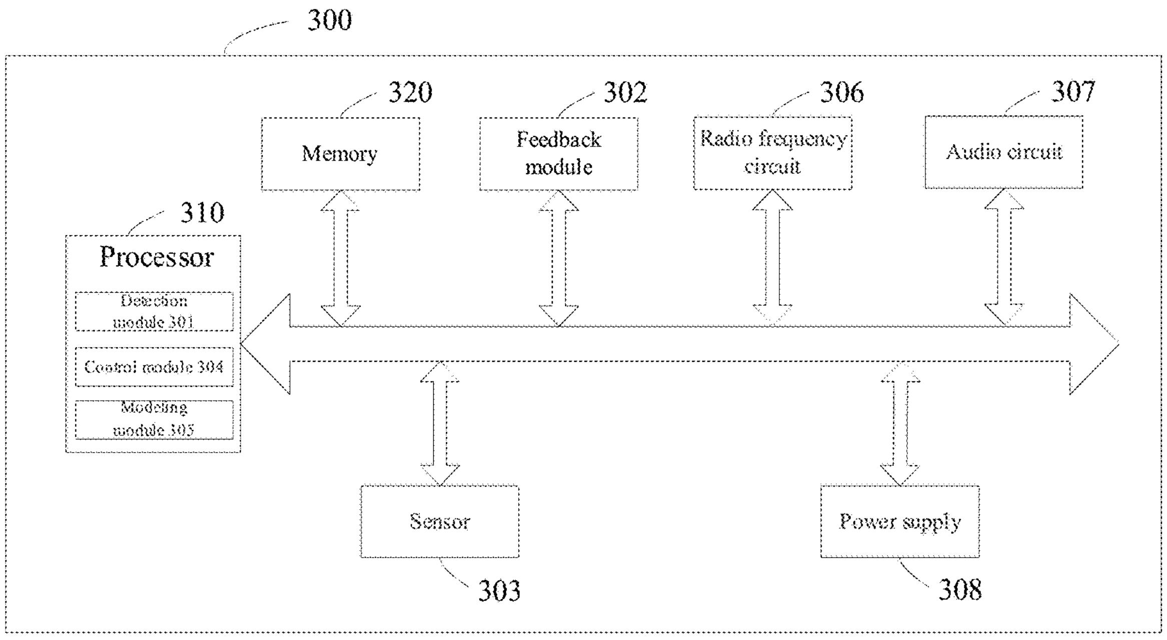
FIG. 11 is a second structural schematic diagram of the terminal device provided by another embodiment of the present application.
Figure 12:
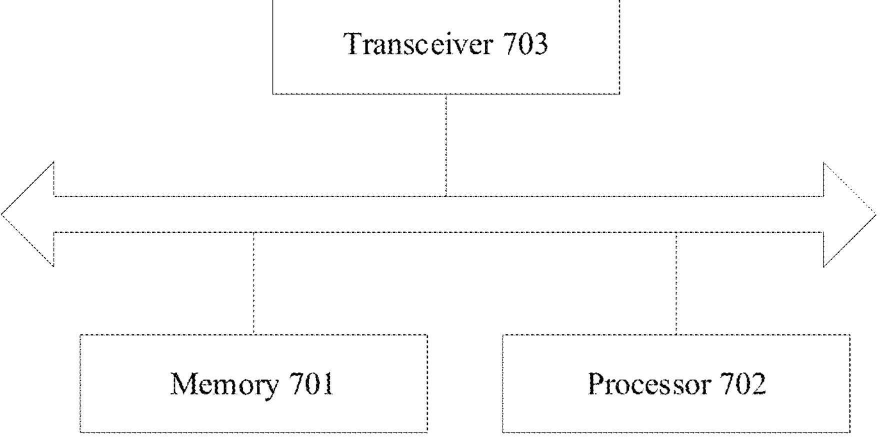
FIG. 12 is a structural schematic diagram of an electronic device provided by an embodiment of the present disclosure.

FIG. 11 is another structural schematic diagram of the terminal device provided by the embodiment of the present application. In some embodiments, as shown in FIG. 11, the terminal device 300 further includes a processor 310 with one or more processing cores, a memory 320 with one or more computer-readable storage media, and a computer program stored in the memory 320 and executable by the processor. The processor 310 is electrically connected to the memory 320. It can be understood by those skilled in the art that the structure of the terminal device as shown in the figure does not constitute a limitation to the terminal device, which may include more or less components than those shown in the figure, or combine some components, or have different component arrangements.

The processor 310 is the control center of the terminal device 300, connects all parts of the terminal device 300 with various interfaces and lines, and performs various functions and processes data of the terminal device 300 by running or loading software programs and/or modules stored in the memory 320 and using data stored in the memory 320, thus monitoring the terminal device 300 as a whole.

In the embodiments of the present application, the processor 310 in the terminal device 300 will load the instructions corresponding to the processes of one or more application programs into the memory 320 according to the following steps, and the processor 310 will run the application programs stored in the memory 320, thus realizing various functions:

acquiring object information of a virtual object that has entered a target space area;

determining whether the task difficulty adjustment condition is met or not according to the object information; and adjusting the task difficulty corresponding to the target space area when the task difficulty adjustment condition is met, and providing the task content matched with the adjusted task difficulty in the current task stage.

The specific implementation of the above operations can be found in the previous embodiments, and will not be described here.

In some embodiments, the processor 310 may include a detection module 301, a control module 304, and a modeling module 305.

In some embodiments, as shown in FIG. 11, the terminal device 300 further includes a radio frequency circuit 306, an audio circuit 307, and a power supply 308. The processor 310 is electrically connected to the memory 320, the feedback module 302, the sensor 303, the RF circuit 306, the audio circuit 307 and the power supply 308. It can be understood by those skilled in the art that the terminal equipment structure shown in FIG. 10 or FIG. 11 does not constitute a limitation to the terminal device, and may include more or less components than shown, or combine some components, or have different component arrangements.

The RF circuit 306 can be used to transmit and receive RF signals to establish wireless communication with a network device or other terminal device through wireless communication, and to transmit and receive signals with the network device or other terminal device.

The audio circuit 307 can be used to provide an audio interface between the user and the terminal equipment through speakers and microphones. The audio circuit 307 can transmit the electrical signal converted from the received audio data to the speaker, and the speaker can convert it into a sound signal for output. On the other hand, the microphone converts the collected sound signals into electrical signals, which are received by the audio circuit 307 and converted into audio data, and then the audio data is output to the processor 301 for processing, and then sent to another terminal device through the radio frequency circuit 306, or the audio data is output to the memory for further processing. The audio circuit 307 may also include an earphone jack to provide communication between a peripheral earphone and the terminal device. The power supply 308 is used to supply power to various components of the terminal device 300.

Although not shown in FIG. 10 or FIG. 11, the terminal device 300 may also include a camera, a wireless fidelity module, a Bluetooth module, an input module, etc., which are not described in detail here.

It should be understood that the apparatus embodiment and the method embodiment are allowed to correspond to each other, and the similar description is allowed to refer to the method embodiment. To avoid repetition, the similar description is not repeated herein. Specifically, the apparatus is allowed to execute the above method embodiment, and the description and other operations and/or functions of each module in the apparatus are respectively the corresponding process of each method in the above method embodiment, which is not repeated herein for brevity.

The apparatus of the embodiments of the present disclosure is described in conjunction with the drawings from the perspective of functional modules. It should be understood that the functional module is allowed to be implemented in the form of hardware, is also allowed to be implemented by the instruction in the form of software, and is also allowed to be implemented by a combination of hardware and software modules. Specifically, each step of the method embodiment in the embodiments of the present disclosure is allowed to be completed by the integrated logic circuit of hardware and/or the instruction in the form of software in the processor, in conjunction with the method disclosed in the embodiments of the present disclosure, is allowed to be directly reflected as the execution of the hardware decoding processor, or is executed with the combination of the hardware and software modules in the decoding processor. Optionally, the software module is allowed to be located in a random-access memory, a flash memory, a read-only memory, a programmable read-only memory, an electrically erasable programmable memory, a register and other mature storage medium in the art. The storage medium is located in a memory. A processor reads the information in the memory, and combines the hardware of the processor to complete the steps in the method embodiment.

FIG. 6 is a structural schematic diagram of an electronic device provided by the embodiment of the present disclosure, and the electronic device is allowed to include: a memory 701 and a processor 702, in which the memory 701 is configured to store a computer program, and transmits the program code to the processor 702. In other words, the processor 702 is allowed to invoke and execute a computer program from the memory 701 to implement the various methods in embodiments of the present disclosure.

For example, the processor 702 is allowed to be configured to execute the above method embodiment according to the instruction in the computer program.

In some embodiments of the present disclosure, the processor 702 is allowed to include, but is not limited to: a general-purpose processor, a digital signal processor (DSP), an application specific integrated circuit (ASIC), a Field Programmable Gate Array (FPGA), or other programmable logic device, a discrete gate, or a transistor logic device, a discrete hardware component, etc.

In some embodiments of the present disclosure, the memory 701 includes, but is not limited to: a volatile memory and/or non-volatile memory. The non-volatile memory is allowed to be a read-only memory (ROM), a programmable read-only memory (PROM), an erasable programmable read-only memory (EPROM), an electrically erasable programmable read-only memory (EEPROM) or a flash memory. The volatile memory is allowed to be a random-access memory (RAM), which is used as an external cache. Through an exemplary but not restrictive illustration, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a synch link DRAM (SLDRAM), and a Direct Rambus RAM (DR RAM).

In some embodiments of the present disclosure, the computer program is allowed to be divided into one or more than one module. The one or more than module are stored in the memory 701, and are executed by the processor 702 to complete the method provided by at least one embodiment of the present disclosure. The one or more than one module are allowed to be a series of computer program instruction segments that are allowed to complete a particular function. The instruction segment is used to describe the execution process of the computer program in the electronic device.

As illustrated in FIG. 6, the electronic device is also allowed to include: a transceiver 703, in which the transceiver 703 is allowed to be connected to the processor 702 or the memory 701.

The processor 702 is allowed to control the transceiver 703 to communicate with other devices, specifically, is allowed to send information or data to other devices, or receives information or data sent by other devices. The transceiver 703 is allowed to include a transmitter and a receiver. The transceiver 703 is allowed to further include an antenna, and the quantity of the antenna is allowed to be one or more than one.

It should be understood that various components in the electronic device are connected by a bus system, in which the bus system includes a power bus, a control bus and a status signal bus in addition to a data bus.

At least one embodiment of the present disclosure also provides a computer-readable storage medium, on which a computer program is stored. In the case where the computer program is executed by a computer, the computer is allowed to execute the method of the method embodiment above. In other words, at least one embodiment of the present disclosure also provides a computer program product including an instruction. In the case where the instruction is executed by the computer, the computer is allowed to execute the method of the method embodiment above.

Upon the implementation by software, the method of the method embodiment above is allowed to be implemented in whole or in part in the form of a computer program product. The computer program product includes one or more than one computer instruction. In the case where the computer program instruction is loaded and executed on the computer, the process or function in accordance with the present disclosure is produced in whole or in part. The computer is allowed to be a general-purpose computer, a special purpose computer, a computer network, or other programmable apparatuses. The computer instruction is allowed to be stored in a computer-readable storage medium, or is transmitted from one computer-readable storage medium to another computer-readable storage medium, for example, the computer instruction is allowed to be transmitted from a website site, computer, server or data center to another website site, computer, server or data center by wired (such as a coaxial cable, an optical fiber, a digital subscriber line (DSL)) or wireless (such as infrared, wireless, microwave, etc.) means. The computer-readable storage medium is allowed to be any available medium that the computer is allowed to access, or an integrated sever including one or more than one available medium, a data center and other data storage devices. The available medium is allowed to be a magnetic medium (such as a floppy disk, a hard disk and a tape), an optical medium (such as a digital video disc (DVD)), or a semiconductor medium (such as a solid-state disk (SSD)), and the like.

In one aspect, according to one or more than one embodiment of the present disclosure, a data processing method is provided, including: acquiring the first quantity of the first object in a spatial region corresponding to the first space object, the first space object being an object in a current virtual scene, and the first object being a virtual object corresponding to the first user in the virtual scene; and executing an instruction corresponding to the first space object and/or the first object in the case where the first quantity and the preset intra-group quantity threshold satisfy the first preset relationship.

According to one or more than one embodiment of the present disclosure, the method further includes: with respect to an alternative object in the virtual scene, performing a collision detection on the alternative object and the spatial region corresponding to the first space object, and obtaining a collision detection result for indicating whether the alternative object collides with the spatial region corresponding to the first space object; and according to the collision detection result, determining whether the alternative object is the first object entering the spatial region corresponding to the first space object.

According to one or more than one embodiment of the present disclosure, the first space object is any alternative space object of a plurality of alternative space objects in the virtual scene.

According to one or more than one embodiment of the present disclosure, in the case where the execution unit is configured to execute an instruction corresponding to the first space object and/or the first object, the execution unit is specifically configured for: executing a display instruction corresponding to the first space object and/or the first object.

According to one or more than one embodiment of the present disclosure, in the case where the execution unit is configured to execute an instruction corresponding to the first space object and/or the first object, the execution unit is specifically configured for: executing an audio playback instruction corresponding to the first space object and/or the first object.

According to one or more than one embodiment of the present disclosure, in the case where the execution unit is configured to execute the instruction corresponding to the first space object, the execution unit is specifically configured for: adjusting the position information of the first space object; and in the case where the execution unit is configured to execute the instruction corresponding to the first object, the execution unit is specifically configured for: adjusting the position information and/or attitude information of the first object.

According to one or more than one embodiment of the present disclosure, the apparatus further includes: acquiring the second quantity of the second object in a spatial region corresponding to the second space object, the second space object being an object in the virtual scene, and the second object being a virtual object corresponding to the second user in the virtual scene; and executing an instruction corresponding to the second space object and/or the second object in the case where the second quantity and the preset intra-group quantity threshold satisfy the first preset relationship.

According to one or more than one embodiment of the present disclosure, the instruction corresponding to the first space object and/or the first object is related to the second object.

According to one or more than one embodiment of the present disclosure, the apparatus further includes: acquiring the third quantity of an alternative object in the virtual scene, and the fourth quantity of the alternative space object, in which the alternative object is a virtual object corresponding to at least some users participating in the virtual scene; and determining the preset intra-group quantity threshold based on the third quantity and the fourth quantity.

According to one or more than one embodiment of the present disclosure, in the case where the apparatus is configured for determining the preset intra-group quantity threshold based on the third quantity and the fourth quantity, the apparatus is specifically configured for: performing a remainder operation on the fourth quantity based on the third quantity, and obtaining a remainder operation result; and determining the preset intra-group quantity threshold according to the remainder operation result.

In another aspect, according to one or more embodiments of the application, there is provided a data processing method, which comprises: when it is determined that a first virtual object and a second virtual object satisfy a preset relationship, the type of the first virtual object is adjusted to that of the second virtual object, in which the first virtual object and the second virtual object are virtual objects in a virtual scene, and the type of the second virtual object is the first preset type; when determining that the type of the first virtual object is the first preset type, executing an instruction corresponding to the first virtual object and the first preset type.

According to one or more embodiments of the present application, the data processing method further comprises: when the first virtual object is in contact with the second virtual object, determining that the first virtual object and the second virtual object satisfy a preset relationship.

According to one or more embodiments of the present application, the data processing method further comprises: when the collision box corresponding to the first virtual object and the collision box corresponding to the second virtual object meet the collision relationship, determining that the first virtual object is in contact with the second virtual object.

According to one or more embodiments of the present application, the data processing method further comprises: when the first virtual object and the second virtual object belong to the same preset set, determining that the first virtual object and the second virtual object satisfy a preset relationship.

According to one or more embodiments of the application, the data processing method further comprises: when it is determined that the first virtual object and the third virtual object satisfy the preset relationship, and the third virtual object and the second virtual object satisfy the preset relationship, determining that the first virtual object and the second virtual object satisfy the preset relationship, wherein the third virtual object is a virtual object in the virtual scene, and the type of the third virtual object is the first preset type.

According to one or more embodiments of the present application, the third virtual object includes a plurality of sub-virtual objects, and the data processing method further comprises: when determining that the first virtual object and the first sub-virtual object among the plurality of sub-virtual objects satisfy the preset relationship, and that the second virtual object and the second sub-virtual object among the plurality of sub-virtual objects satisfy the preset relationship, determining that the first virtual object and the second virtual object satisfy the preset relationship.

According to one or more embodiments of the present application, the third virtual object includes a plurality of sub-virtual objects, and the data processing method further includes: determining that the third virtual object and the second virtual object meet a preset relationship when a collision box corresponding to any of the sub-virtual objects collides with a collision box corresponding to the second virtual object; determining that the third virtual object and the first virtual object meet a preset relationship when a collision box corresponding to any one of the plurality of sub-virtual objects collides with a collision box corresponding to the first virtual object.

According to one or more embodiments of the application, the third virtual object is a user avatar, and the position and posture of the collision box corresponding to each sub-virtual object in the third virtual object are determined according to the skeletal unit of the user avatar.

According to one or more embodiments of the present application, the data processing method further comprises: determining that the third virtual object is a first preset type when it is determined that the third virtual object and the second virtual object meet a preset relationship, and executing an instruction corresponding to the third virtual object and the first preset type.

According to one or more embodiments of the present application, the data processing method further comprises: stopping executing the instruction corresponding to the first virtual object and the first preset type when it is determined that the first virtual object and the second virtual object no longer satisfy the preset relationship.

According to one or more embodiments of the application, the data processing method further comprises: acquiring a first setting instruction for the type of the second virtual object by a relevant personnel through a virtual object type setting interface; setting the type of the second virtual object to the first preset type according to the first setting instruction.

According to one or more embodiments of the present application, the data processing method further comprises: acquiring an object graph to which the second virtual object belongs; acquiring a plurality of fourth virtual objects in the target graph; and determining that the second virtual object is the first preset type when it is determined that the plurality of fourth virtual objects contain virtual objects of the first preset type.

According to one or more embodiments of the application, the data processing method further comprises: acquiring a plurality of candidate virtual objects; as for each of the plurality of candidate virtual objects, obtaining a target virtual object that contacts with the candidate virtual object, generating a contact object list corresponding to the candidate virtual object according to the target virtual object, and thus obtaining a plurality of contact object lists corresponding to the plurality of candidate virtual objects; traversing the plurality of contact object lists, and taking the contact object lists containing the same fifth virtual object in the plurality of contact object lists as a first object list to be processed; and generating a corresponding graphs according to the first object list to be processed, wherein the graph includes the sixth virtual objects, and the first object lists to be processed corresponds to the graphs one by one.

According to one or more embodiments of the present application, when there are the first object lists to be processed, the data processing method further comprises: merging graphs corresponding to second object lists to be processed that are in the first object lists and contain seventh virtual objects belonging to the same preset set into the same graph.

According to one or more embodiments of the present application, there is provided a data processing apparatus including an adjusting unit and an execution unit. The adjusting unit is configured to adjust the type of the first virtual object to that of the second virtual object when it is determined that the first virtual object and the second virtual object meet a preset relationship, wherein the second virtual object and the first virtual object are virtual objects in a virtual scene, and the type of the second virtual object is the first preset type; and the execution unit is configured to execute an instruction corresponding to the first virtual object and the first preset type when it is determined that the type of the first virtual object is the first preset type.

According to one or more embodiments of the present application, the data processing device is further configured to take the first virtual object and the second virtual object as satisfying a preset relationship when the first virtual object is in contact with the second virtual object.

According to one or more embodiments of the present application, the data processing device is further configured to take the first virtual object as being in contact with the second virtual object when the collision box corresponding to the first virtual object and the collision box corresponding to the second virtual object meet the collision relationship.

According to one or more embodiments of the present application, the data processing device is further configured to take the first virtual object and the second virtual object as satisfying a preset relationship when the first virtual object and the second virtual object belong to the same preset set.

According to one or more embodiments of the application, the data processing device is further configured to determine that the first virtual object and the second virtual object satisfy the preset relationship when it is determined that the first virtual object and the third virtual object satisfy the preset relationship and the second virtual object and the third virtual object satisfy the preset relationship, wherein the third virtual object is a virtual object in the virtual scene and the type of the third virtual object is the first preset type.

According to one or more embodiments of the application, the third virtual object comprises a plurality of sub-virtual objects, and the data processing device is further configured for determining that the first virtual object and the second virtual object satisfy the preset relationship when it is determined that the first virtual object and the first sub-virtual object in the plurality of sub-virtual objects satisfy the preset relationship and the second virtual object and the second sub-virtual object in the plurality of sub-virtual objects satisfy the preset relationship.

According to one or more embodiments of the application, the third virtual object comprises a plurality of sub-virtual objects, and the data processing device is further configured for determining that the third virtual object and the second virtual object meet a preset relationship when a collision box corresponding to any of the sub-virtual objects collides with a collision box corresponding to the second virtual object; When a collision box corresponding to any one of the plurality of sub-virtual objects collides with a collision box corresponding to the first virtual object, it is determined that the third virtual object and the first virtual object meet the preset relationship.

According to one or more embodiments of the application, the third virtual object is a user avatar, and the position and posture of the collision box corresponding to each sub-virtual object in the third virtual object are determined according to the skeletal unit of the user avatar.

According to one or more embodiments of the present application, the data processing device is further configured to determine that the third virtual object is the first preset type and execute an instruction corresponding to the third virtual object and the first preset type when it is determined that the third virtual object and the second virtual object satisfy a preset relationship.

According to one or more embodiments of the present application, the data processing device is further configured to stop executing instructions corresponding to the first virtual object and the first preset type when it is determined that the first virtual object and the second virtual object no longer satisfy the preset relationship.

According to one or more embodiments of the present application, the data processing device is further configured for: obtaining a first setting instruction for the type of the second virtual object by a relevant personnel through a virtual object type setting interface; and setting the type of the second virtual object to the first preset type according to the first setting instruction.

According to one or more embodiments of the present application, the data processing device is further configured for: acquiring an object graph to which the second virtual object belongs; acquiring a plurality of fourth virtual objects in the target graph; and determining that the second virtual object is the first preset type when it is determined that the plurality of fourth virtual objects contain a virtual object of the first preset type.

According to one or more embodiments of the present application, the data processing apparatus is further configured for: acquiring a plurality of candidate virtual objects; for each of the plurality of candidate virtual objects, obtaining a target virtual object that contacts with the candidate virtual object, and obtaining a plurality of contact object lists corresponding to the plurality of candidate virtual objects by generating a contact object list corresponding to the candidate virtual object according to the target virtual object; traversing the plurality of contact object lists, and taking the contact object lists containing the same fifth virtual object in the plurality of contact object lists as first object lists to be processed; and generating corresponding graphs according to the first object lists to be processed, wherein the graphs include sixth virtual objects, and the first object lists to be processed corresponds to the graphs one by one.

According to one or more embodiments of the present application, when there are first object lists to be processed, the data processing device is further configured to merge a plurality of graphs, corresponding to a plurality of second object lists to be processed including seventh virtual objects belonging to the same preset in the first object lists to be processed set, into the same graph.

In another aspect, according to one or more embodiments of the present application, there is provided a task adjustment method, which includes: acquiring object information of a virtual object that has entered a target space area; determining whether the task difficulty adjustment condition is met according to the object information; adjusting the task difficulty corresponding to the target space area when the task difficulty adjustment condition is met, and providing the task content matched with the adjusted task difficulty in the current task stage.

According to one or more embodiments of the application, the task adjustment method further comprises: determining that the virtual object has entered the target space area when the virtual object and the target space area meet collision conditions.

According to one or more embodiments of the present application, the object information includes the number of objects and/or an object attribute.

According to one or more embodiments of the present application, the determining whether the task difficulty adjustment condition is met according to the object information, includes: determining that the task difficulty adjustment condition is met when the number of objects matches a preset number threshold.

According to one or more embodiments of the application, the adjusting the task difficulty corresponding to the target space area when the task difficulty adjustment condition is met, and the providing the task content matched with the adjusted task difficulty in the current task stage, includes: adjusting the task difficulty of the current task stage corresponding to all virtual objects in the target space area when the task difficulty adjustment condition is met, and providing the task content matched with the adjusted task difficulty to all virtual objects in the current task stage, wherein the task content matched with the adjusted task difficulty is the same task content for all virtual objects.

According to one or more embodiments of the application, the adjusting the task difficulty corresponding to the target space area when the task difficulty adjustment condition is met, and the providing the task content matched with the adjusted task difficulty in the current task stage, includes: adjusting the task difficulty of one or more subtasks in the current task stage corresponding to each virtual object in the target space area, and providing all virtual objects with the task content matched with the adjusted task difficulty in the current task stage, wherein the task content matched with the adjusted task difficulty is different for the subtasks corresponding to each virtual object.

According to one or more embodiments of the present application, the determining whether the task difficulty adjustment condition is met according to the object information includes: determining whether there is a target virtual object in the virtual objects that meets the task difficulty adjustment condition according to the object attribute, wherein the target virtual object is at least one of the virtual objects; and, the adjusting the task difficulty corresponding to the target space area when the task difficulty adjustment condition is met, and the providing the task content matched with the adjusted task difficulty in the current task stage, includes: adjusting the task difficulty of the current task stage corresponding to the target virtual object in the target space area when the task difficulty adjustment condition is met, and providing the target virtual object with the task content matching the adjusted task difficulty in the current task stage, wherein the task content matching the adjusted task difficulty is different for different virtual objects in the target virtual object.

According to one or more embodiments of the present application, the object attributes include at least one selected from the group consisting of: object type, object-related item, and object level.

According to one or more embodiments of the present application, the target spatial region is one of a plurality of spatial regions in the current virtual scene.

According to one or more embodiments of the present application, the task adjustment method further comprises: displaying a virtual scene picture containing the target space area through a terminal device, and displaying the task content matched with the adjusted task difficulty in the task execution picture.

According to one or more embodiments of the present application, the terminal device includes any one selected from the group consisting of an augmented reality device, a virtual reality device, an augmented reality device or a mixed reality device.

According to one or more embodiments of the present application, there is provided a task adjusting device, which includes:

an acquisition unit configured for acquiring object information of a virtual object that has entered a target space area;

a determination unit, configured for determining whether the task difficulty adjustment condition is met according to the object information; and a processing unit, configured for adjusting the task difficulty corresponding to the target space area when the task difficulty adjustment condition is met, and providing the task content matched with the adjusted task difficulty in the current task stage.

According to one or more than one embodiment of the present disclosure, a data processing device is provided, including: at least one processor and at least one memory, which is configured to store executable instructions of the at least one processor; the at least one processor is configured to execute the above data processing method by executing the executable instructions.

According to one or more than one embodiment of the present disclosure, a computer-readable storage medium is provided, on which a computer program is stored. In the case where the computer program is executed by the at least one processor, the data processing method is implemented.

Those of ordinary skill in the art can be aware that the modules and algorithm steps of each example that is described by the embodiments of the present disclosure is allowed to be implemented by electronic hardware, or a combination of computer software and electronic hardware. Whether these functions are executed by means of hardware or software depends on the specific application and design constraint conditions of the technical solution. Professional technicians are allowed to use different methods for each particular application to implement the described function, but such implementation should not be considered beyond the scope of the present disclosure.

In at least one embodiment of the present disclosure, it should be understood that the disclosed system, apparatus and method are allowed to be implemented by other methods. For example, the device embodiment described above is only exemplary, for example, the division of the module is only a logical function division, the division of the module is allowed to have another division upon the actual implementation, for example, a plurality of modules or components are allowed to be combined or integrated into another system, or some features is allowed to be ignored or not performed. On another point, the coupling or direct coupling or communication connection between each other that are displayed or discussed are through some interfaces, and the indirect coupling or communication connection between the apparatus or the module is allowed to be electrical, mechanical or in other forms.

The module described as a separate component is allowed to be or is allowed to not be physically separated, and the component displayed as a module is allowed to be or is allowed to not be a physical module, i.e. is allowed to be located in one place, or is also allowed to be distributed on a plurality of network units. According to the actual requirement, a portion of or all of the module is allowed to be selected to implement the purpose of the present embodiments. For example, each functional module in each embodiment of the present disclosure is allowed to be integrated in a processing module, or each module is allowed to exist physically separately, or two or more than two modules are allowed to be integrated in one module.

The above is only a specific embodiment of the present disclosure, but the protection scope of the present disclosure is not limited to it. A change or a replacement that can be easily thought by any technician who is familiar with the art in the scope of the technology that is disclosed in the disclosure, should be covered in the protection scope of the disclosure. Therefore, the protection scope of the present disclosure should be subject to the protection scope of the claims.

What is claimed is:

1. A data processing method, comprising:

determining whether real-time coordinates of a first object in a virtual scene are included in a spatial region corresponding to a first space object, the first space object being an object in the virtual scene, and the first object being a virtual object corresponding to a first user in the virtual scene;

determining that the first object enters the spatial region corresponding to the first space object in response to determining that the real-time coordinates of the first object are included in the spatial region corresponding to the first space object;

acquiring a first quantity of the first object entering the spatial region corresponding to the first space object; and executing different instructions to indicate different states of the first space object based on different results of comparing the first quantity to a preset intra-group quantity threshold.

2. The data processing method of claim 1, further comprising:

with respect to an alternative object in the virtual scene, performing a collision detection on the alternative object and the spatial region corresponding to the first space object, and obtaining a collision detection result used to indicate whether the alternative object collides with the spatial region corresponding to the first space object; and according to the collision detection result, determining whether the alternative object is the first object entering the spatial region corresponding to the first space object.

3. The data processing method of claim 2, further comprising:

acquiring a second quantity of a second object entering a spatial region corresponding to a second space object, the second space object being the object in the virtual scene, and the second object being the virtual object corresponding to a second user in the virtual scene; and executing an instruction corresponding to the second space object and/or the second object in a case where the second quantity and the preset intra-group quantity threshold satisfy a second preset relationship.

4. The data processing method of claim 3, wherein the instruction corresponding to the first space object and/or the first object is related to the second object.

5. The data processing method of claim 1, wherein the first space object is any alternative space object of a plurality of the alternative space objects in the virtual scene.

6. The data processing method of claim 1, wherein the executing an instruction corresponding to the first space object and/or the first object, comprises:

executing a display instruction corresponding to the first space object and/or the first object.

7. The data processing method of claim 1, wherein the executing an instruction corresponding to the first space object and/or the first object, comprises:

executing an audio playback instruction corresponding to the first space object and/or the first object.

8. The data processing method of claim 1, wherein the executing an instruction corresponding to the first space object, comprises:

adjusting position information of the first space object; and the executing an instruction corresponding to the first space object, comprises:

adjusting position information and/or attitude information of the first object.

9. The data processing method of claim 1, further comprising:

acquiring a third quantity of an alternative object in the virtual scene, and a fourth quantity of an alternative space object, the alternative object being a virtual object corresponding to at least some of users participating in the virtual scene; and determining the preset intra-group quantity threshold based on the third quantity and the fourth quantity.

10. The data processing method of claim 9, wherein the determining the preset intra-group quantity threshold based on the third quantity and the fourth quantity, comprises:

performing a remainder operation on the fourth quantity based on the third quantity, and obtaining a remainder operation result; and determining the preset intra-group quantity threshold according to the remainder operation result.

11. An electronic device, comprising:

at least one processor; and at least one memory, configured to store executable instructions, wherein the at least one processor is configured to implement operations upon executing the executable instructions, and the operations comprise:

determining whether real-time coordinates of a first object in a virtual scene are included in a spatial region corresponding to a first space object, the first space object being an object in the virtual scene, and the first object being a virtual object corresponding to a first user in the virtual scene;

determining that the first object enters the spatial region corresponding to the first space object in response to determining that the real-time coordinates of the first object are included in the spatial region corresponding to the first space object;

acquiring a first quantity of the first object entering the spatial region corresponding to the first space object; and executing different instructions to indicate different states of the first space object based on different results of comparing the first quantity to a preset intra-group quantity threshold.

12. The electronic device of claim 11, wherein the method further comprises:

with respect to an alternative object in the virtual scene, performing a collision detection on the alternative object and the spatial region corresponding to the first space object, and obtaining a collision detection result used to indicate whether the alternative object collides with the spatial region corresponding to the first space object; and according to the collision detection result, determining whether the alternative object is the first object entering the spatial region corresponding to the first space object.

13. The electronic device of claim 12, wherein the method further comprises:

acquiring a second quantity of a second object entering a spatial region corresponding to a second space object, the second space object being the object in the virtual scene, and the second object being the virtual object corresponding to a second user in the virtual scene; and executing an instruction corresponding to the second space object and/or the second object in a case where the second quantity and the preset intra-group quantity threshold satisfy a second preset relationship.

14. The electronic device of claim 13, wherein the instruction corresponding to the first space object and/or the first object is related to the second object.

15. The electronic device of claim 11, wherein the first space object is any alternative space object of a plurality of the alternative space objects in the virtual scene.

16. The electronic device of claim 11, wherein the executing an instruction corresponding to the first space object and/or the first object, comprises:

executing a display instruction corresponding to the first space object and/or the first object.

17. The electronic device of claim 11, wherein the executing an instruction corresponding to the first space object and/or the first object, comprises:

executing an audio playback instruction corresponding to the first space object and/or the first object.

18. The electronic device of claim 11, wherein the executing an instruction corresponding to the first space object, comprises:

adjusting position information of the first space object; and the executing an instruction corresponding to the first space object, comprises:

adjusting position information and/or attitude information of the first object.

19. A non-transitory computer-readable storage medium, storing a computer program, wherein the computer program, when executed by at least one processor, causes the at least one processor to implement operations comprising:

determining whether real-time coordinates of a first object in a virtual scene are included in a spatial region corresponding to a first space object, the first space object being an object in the virtual scene, and the first object being a virtual object corresponding to a first user in the virtual scene;

determining that the first object enters the spatial region corresponding to the first space object in response to determining that the real-time coordinates of the first object are included in the spatial region corresponding to the first space object;

acquiring a first quantity of the first object entering the spatial region corresponding to the first space object; and executing different instructions to indicate different states of the first space object based on different results of comparing the first quantity to a quantity threshold.

* * * * *